(12) United States Patent
Wellons et al.

(10) Patent No.: US 8,146,807 B2
(45) Date of Patent: Apr. 3, 2012

(54) METHOD AND SYSTEM FOR MANAGING CASE BASED PROMISES TO PAY

(75) Inventors: Randall S. Wellons, Washington, DC (US); Kent Hayato Takata, San Francisco, CA (US); Kelly DeForest, Virginia Beach, VA (US)

(73) Assignee: CGI Technologies and Solutions Inc., Fairfax, VA (US)

( * ) Notice: Subject to any disclaimer, the term of this patent is extended or adjusted under 35 U.S.C. 154(b) by 1123 days.

(21) Appl. No.: 12/007,128

(22) Filed: Jan. 7, 2008

(65) Prior Publication Data

US 2008/0201248 A1 Aug. 21, 2008

Related U.S. Application Data

(63) Continuation-in-part of application No. 09/356,048, filed on Jul. 16, 1999, now Pat. No. 7,318,046.

(51) Int. Cl.
*G06Q 40/00* (2006.01)
(52) U.S. Cl. .......................................... 235/380; 705/40
(58) Field of Classification Search .................... 705/35, 705/40; 235/375, 376, 379, 380
See application file for complete search history.

(56) References Cited

U.S. PATENT DOCUMENTS

| | | | |
|---|---|---|---|
| 7,103,577 B2 | 9/2006 | Blair et al. | |
| 7,117,172 B1 * | 10/2006 | Black | 705/35 |
| 7,158,955 B2 | 1/2007 | Diveley et al. | |
| 7,165,052 B2 | 1/2007 | Diveley et al. | |
| 7,191,150 B1 | 3/2007 | Shao et al. | |
| 7,194,431 B1 * | 3/2007 | Land et al. | 705/30 |
| 7,249,074 B1 * | 7/2007 | Land et al. | 705/34 |
| 7,318,046 B1 * | 1/2008 | Wellons et al. | 705/38 |
| 7,376,603 B1 * | 5/2008 | Mayr et al. | 705/35 |
| 7,383,215 B1 * | 6/2008 | Navarro et al. | 705/36 R |
| 7,657,436 B2 * | 2/2010 | Elmore et al. | 705/1.1 |
| 7,853,492 B1 * | 12/2010 | Kirklin et al. | 705/28 |
| 2001/0005836 A1 | 6/2001 | Yang | |
| 2002/0059139 A1 | 5/2002 | Evans | |
| 2002/0133458 A1 | 9/2002 | Zhou et al. | |
| 2004/0019560 A1 | 1/2004 | Evans et al. | |
| 2004/0044607 A1 | 3/2004 | Hedrick, Jr. et al. | |
| 2005/0278246 A1 | 12/2005 | Friedman et al. | |
| 2005/0283418 A1 | 12/2005 | Thornborough et al. | |
| 2006/0080236 A1 | 4/2006 | Welker et al. | |
| 2006/0143104 A1 | 6/2006 | Wagonheim | |
| 2007/0100746 A1 | 5/2007 | Blair et al. | |
| 2007/0156552 A1 | 7/2007 | Manganiello | |
| 2007/0156557 A1 | 7/2007 | Shao et al. | |
| 2007/0156581 A1 | 7/2007 | Imrey et al. | |

* cited by examiner

*Primary Examiner* — Andrew Joseph Rudy
(74) *Attorney, Agent, or Firm* — Posz Law Group, PLC

(57) ABSTRACT

A method of managing case based promises to pay includes displaying a customer hierarchy. The customer hierarchy displays (i) a customer level with customer level information and (ii) plural account levels with account level information for respective multiple accounts of a customer needing collection. Also included is displaying action now amounts for the customer on the customer level and on the account levels of the customer hierarchy; wherein the account level information is rolled up into the customer level information. The method further includes interacting with a user to select the action now amount for an upper level in the customer hierarchy, and dispersing a partitioned amount of the action now amount to levels which the customer can promise to pay, for levels which are hierarchically below the level of the selected action now amount in the customer hierarchy.

25 Claims, 29 Drawing Sheets

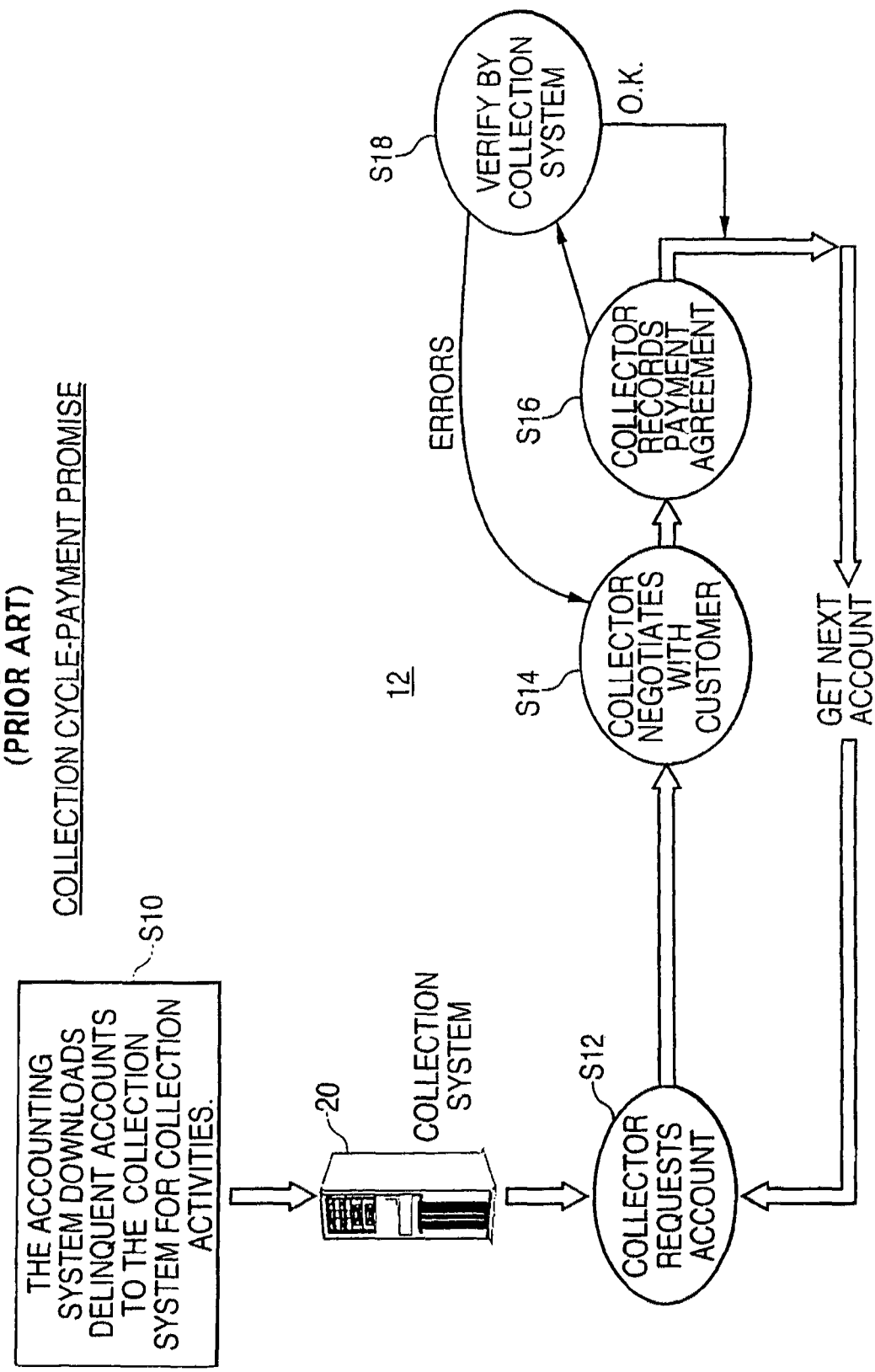

FIG. 2
(PRIOR ART)
CACS® ENTERPRISE COLLECTION DISPLAY

```
 ********1********2********3********4********5********6********7********8
1  ZWIN      F017           CACS WINDOWS      MIKE     04/30/92  12:05
2  101112 0202          NFN F03     DSP PRI    NEXT 0202
3
4           DEMOGRAPHIC        I I       AUTOMATED COLLECTION ADVISOR
5              AREA            I I              USER-DEFINED
6                              I I            SITUATION SUMMARY - 34
7              32              I I
8                              I I
9                              I I   BAID MEMO BAID MEMO BAID MEMO USER MM/DD/YY
10 *************************************************************************
11
12
13                          VIEW AREA - 36
14
15
16
17 *********************************************************** # OF #
18 FLASH MEMO LINE_____
19    LTR/PMT   DATE   TIME AC P C RTE  PROMISE 1    PROMISE 2   EX T COLL BALANCE
20           04/30/97  1040  _ _ _ __                             MIKE   627
21     38    04/30/97  0225 BP    F03                                    627
22       50  04/24/97  0230 PY    F05                                    627
23           04/16/97  1230 OC H A F05    100 04/27          G * MIKE    677
24  1-MORE 2-MEN 3-OFF 10-NXT 11-LKU 13-MAP 14-DM 17-S/WK 18-S/DM 19-S/BWD 20-S/VW
    ********1********2********3********4********5********6********7********8
```

Incoming Call

Place of contact: 42-2
Party contacted: 42-1
Disputed amount: 42-5
Route to state: 42-3
Hold date: 42-6
Excuse: 42-4
Time: 3:00 PM — 42-7

[Promise | Correspondence | History text] — 44

Promise Advisor — 46
- Min promise amount: $ 100.00 — 46-1
- Delinquent amount: $ 105.00 — 46-3
- Balance on amount: $ 1205.00
- Max promise date: Aug. 25, 1998 — 46-2
- Current amount due: $ 205.00 — 46-4
- Overlimit amount: $ 205.00 — 46-6, 46-5
- Rec. promise amount 1: $ 205.00 — 46-7
- Rec. promise date 1: Aug. 25, 1998 — 46-8

Promise Type — 48
- 48-1 ● Single
- ○ Two Part — 48-2
- ○ Long Term — 48-3
- ○ Deferred — 48-4

Promise 1 Detail — 50
- Promise amount: 50-1A
- Promise date: 50-1B
- 50-1

40

[Submit Action & Get Next] [Submit Action] [Cancel] — 52

FIG. 3B

Incoming Call

Place of contact: 42-2
Party contacted: 42-1
Disputed amount: 42-5
Route to state: 42-3
Hold date: 42-6
Excuse: 42-4
Time: 3:00 PM

— 42

44-1
44 { Promise | Correspondence | History text    42-7

Promise Advisor
- Min promise amount: $100.00  46-1
- Delinquent amount: $105.00  46-3
- Balance on amount: $1205.00
- Max promise date: Aug. 25, 1998  46-2
- Current amount due: $205.00  46-4
- Overlimit amount: $205.00
- 46-6    46-5
- Rec. promise amount 1: Aug. 25, 1998  46-7
- Rec. promise date 1: $205.00  46-8
- Rec. promise amount 2: Aug. 25, 1998  46-9
- Rec. promise date 2: $205.00  46-10

— 46

Promise Type — 48
48-1 ○ Single    ● Two Part    ○ Long Term    ○ Deferred
       48-2          48-3            48-4

Promise 1 Detail  50-1
Promise amount: 50-1A
Promise date: 50-1B

Promise 2 Detail  50-2
Promise amount: 50-2A
Promise date: 50-2B

40

[Submit Action & Get Next] [Submit Action] [Cancel]

Incoming Call

| Place of contact: | Party contacted: | Disputed amount: |
|---|---|---|
| 42-2 ▽ | 42-1 ▽ | 42-5 |

| Route to state: | Hold date: | Excuse: | Time: |
|---|---|---|---|
| 42-3 ▽ | 42-6 | 42-4 ▽ | 3:00 PM |

— 42, 42-7

44-1

44 { Promise | Correspondence | History text

Promise Advisor

| Min promise amount | Delinquent amount: | Balance on amount: |
|---|---|---|
| $ 100.00  46-1 | $ 105.00  46-3 | $ 1205.00 |

| Max promise date 46-2 | Current amount due: | Overlimit amount: |
|---|---|---|
| Aug. 25, 1998 | $ 205.00  46-4 | $ 205.00 |

46-6   46-5

| Rec. promise amount 1 | Rec. promise date 1 | |
|---|---|---|
| Aug. 25, 1998  46-7 | $ 205.00  46-8 | 46-13 |

| Rec. LT pmt amount | Rec. frequency  46-12 | Rec. day |
|---|---|---|
| $ 125.00  46-11 | Monthly | 5 |

— 46

Promise Type — 48

48-1 ○ Single    ○ Two Part    ⊙ Long Term    ○ Deferred
         48-2          48-3            48-4

Promise 1 Detail  50-1

| Promise amount: | Promise date: |
|---|---|
| 50-1A | 50-1B |

Long Term Promise  50-3

| Promise Amount | Frequency: | Day: |
|---|---|---|
| 50-3A | 50-3B ▽ | 50-3C |

— 50

| Submit Action & Get Next | Submit Action | Cancel |

Incoming Call

| Place of contact: | Party contacted: | Disputed amount: |
|---|---|---|
| 42-2 | 42-1 | 42-5 |

| Route to state: | Hold date: | Excuse: | Time: |
|---|---|---|---|
| 42-3 | 42-6 | 42-4 | 3:00 PM |

Promise | Correspondence | History text

Promise Advisor

| Min promise amount | Delinquent amount: | Balance on amount: |
|---|---|---|
| $ 100.00 | $ 105.00 | $ 1205.00 |

| Max promise date | Current amount due: | Overlimit amount: |
|---|---|---|
| Aug. 25, 1998 | $ 205.00 | $ 205.00 |

| Rec. promise amount 1 | Rec. promise date 1 | |
|---|---|---|
| Aug. 25, 1998 | $ 205.00 | |

| Rec. DPA pmt. amount | Rec. frequency | Rec. # of payments |
|---|---|---|
| $ 125.00 | Monthly | 5 |

Promise Type
○ Single   ○ Two Part   ○ Long Term   ● Deferred

Down Payment Information

| Amount | Date |
|---|---|
| 50-4A | 50-4B |

Deferred Payment Arrangement

| Promise Amount: | Frequency: | # of pmts: | Total amount: | Day: |
|---|---|---|---|---|
| 50-5A | 50-5C | 50-5B | 50-5D | CALCULATE |

[Submit Action & Get Next] [Submit Action] [Cancel]

Party Contacted          42-1

Attorney
  Secondary
  Accountholder
  Other
  Left message to call
  Disconnected
  Accountant / Bookkeeper
  No answer
  Spouse
  Busy
  Accountholder
  No longer employed here

Figure 4A

Place of Contact          42-2

Secondary / Joint Home
  Other
  Bank Contact
  Secondary / Joint Business
  Business
  Home
  Information/ Operator

Figure 4B

Route to State                42-3

This list is customized at each implementation.

A few examples could include:

Waiting Call by Day Collector
Waiting Call by Same Collector
Broken Promise Review
Awaiting Supervisor Review
No Good Check Review

Figure 4C

Excuse Code                42-4

This list is customized at each implementation.

A few examples could include:

Death in Family
Out of Town
Illness
Lost Job
Working Part-Time

| Promise Option Advisory Field | Definition |
|---|---|
| Minimum Promise Amount (1) | This value is the minimum acceptable promise amount. The minimum promise amount is the greatest of the following three values, or calculations:<br>　1. Minimum acceptable commitment amount from the CACS® parameter table<br>　2. Minimum acceptable commitment percentage (from the CACS® parameter table) multiplied by the Total Delinquent Amount for the customer's account;<br>　3. Minimum acceptable Over Limit percentage (from the CACS® parameter table) multiplied by the Over Limit Amount for the customer's account.<br>Note: In certain instances users may override the minimum acceptable promise amount. |
| Delinquent Amount (2) | The amount of delinquency on the customer's account. Account financial details are sourced from an accounting system. |
| Balance on Account (3) | The outstanding balance on the customer's account. Account financial details are sourced from the accounting system. |
| Maximum Promise Date (4) | The last acceptable date that a customer can commit to make a payment. This is derived by adding the Maximum promise interval days parameter to the current date. The Maximum promise interval days parameter is stored in a collection system such as CACS® or is determined by each financial institution installing the promise option advisory module. |
| Current Amount Due (5) | The current payment amount due on the customer's account. Account financial details are sourced from accounting system. |
| Overlimit Amount (6) | The amount the customer's account is over the credit limit. Account financial details are sourced from accounting system. |
| Recommended Promise Amount 1 (7) | The amount of money that the customer should ideally pay their first promised payment, based upon decision logic. |

Figure 5B

| Promise Option Advisory Field | Definition |
|---|---|
| Recommended Promise Date 1(8) | The date on which the customer should ideally pay their first promised payment, based on decision logic. |
| Recommended Promise Amount 2 (9) | The amount of money that the customer should ideally pay for the second part of the two-part promise, based upon decision logic. |
| Recommended Promise Date 2(10) | The date on which the customer should ideally pay the second part of the two-part promise, based on decision logic. |
| Recommended Long Term Promise Amount (11) | The amount of money that the customer should ideally pay each of the long term promises, based upon decision logic. |
| Recommended Long Term Frequency (12) | The frequency that the customer should ideally pay each of the promises, based upon decision logic. |
| Recommended Long Term Day (13) | The day on which the customer should ideally pay each of the promises, based upon decision logic. |
| Recommended Deferred Payment Arrangement (DPA) Amount (14) | The amount of money that the customer should ideally pay each of the promises, based upon decision logic. |
| Recommended DPA Frequency (15) | The frequency that the customer should ideally pay each of the promises, based upon decision logic. |
| Recommended DPA Number of Payments (16) | The number of payments that the customer should ideally make to bring the account up to date, based on decision logic. |

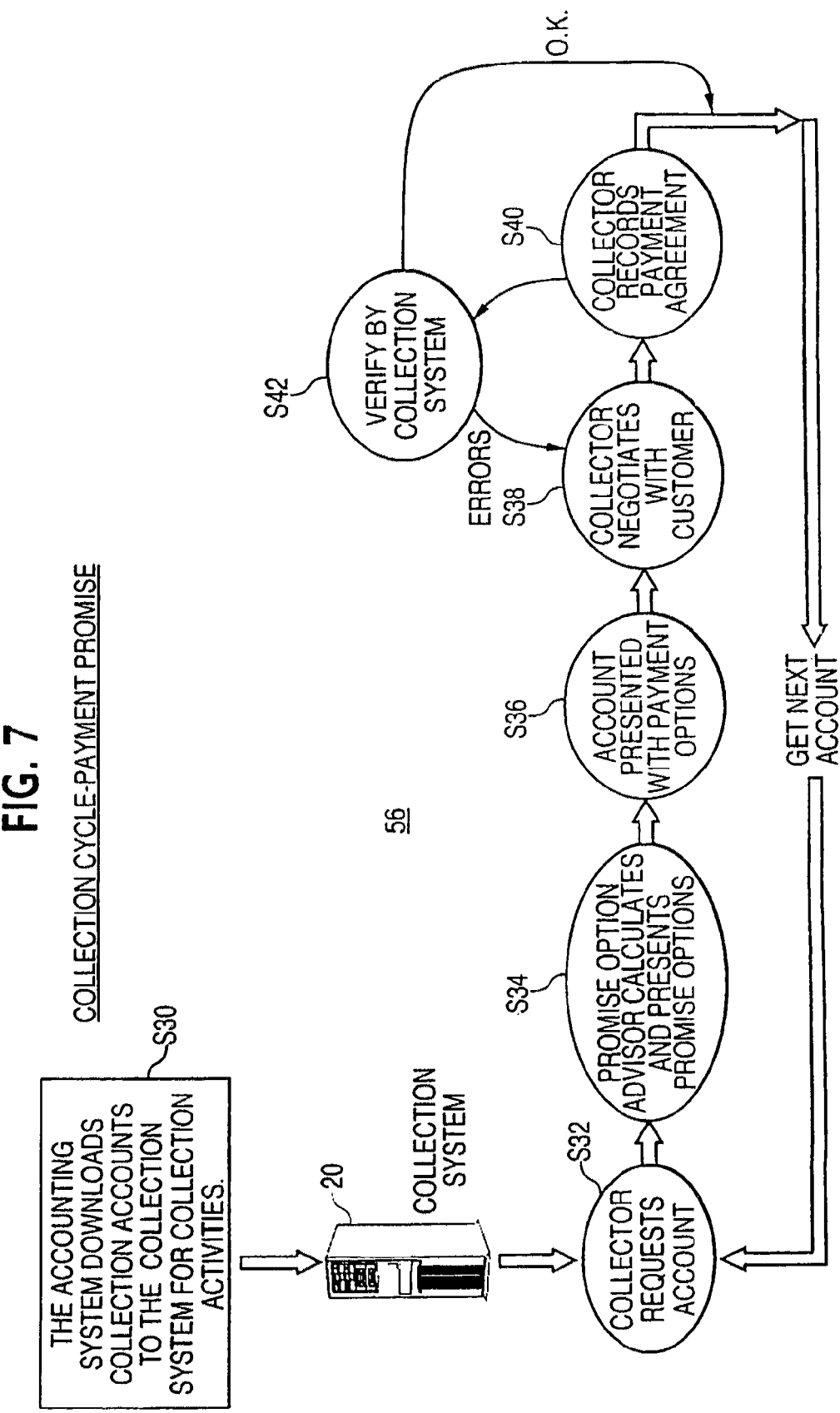

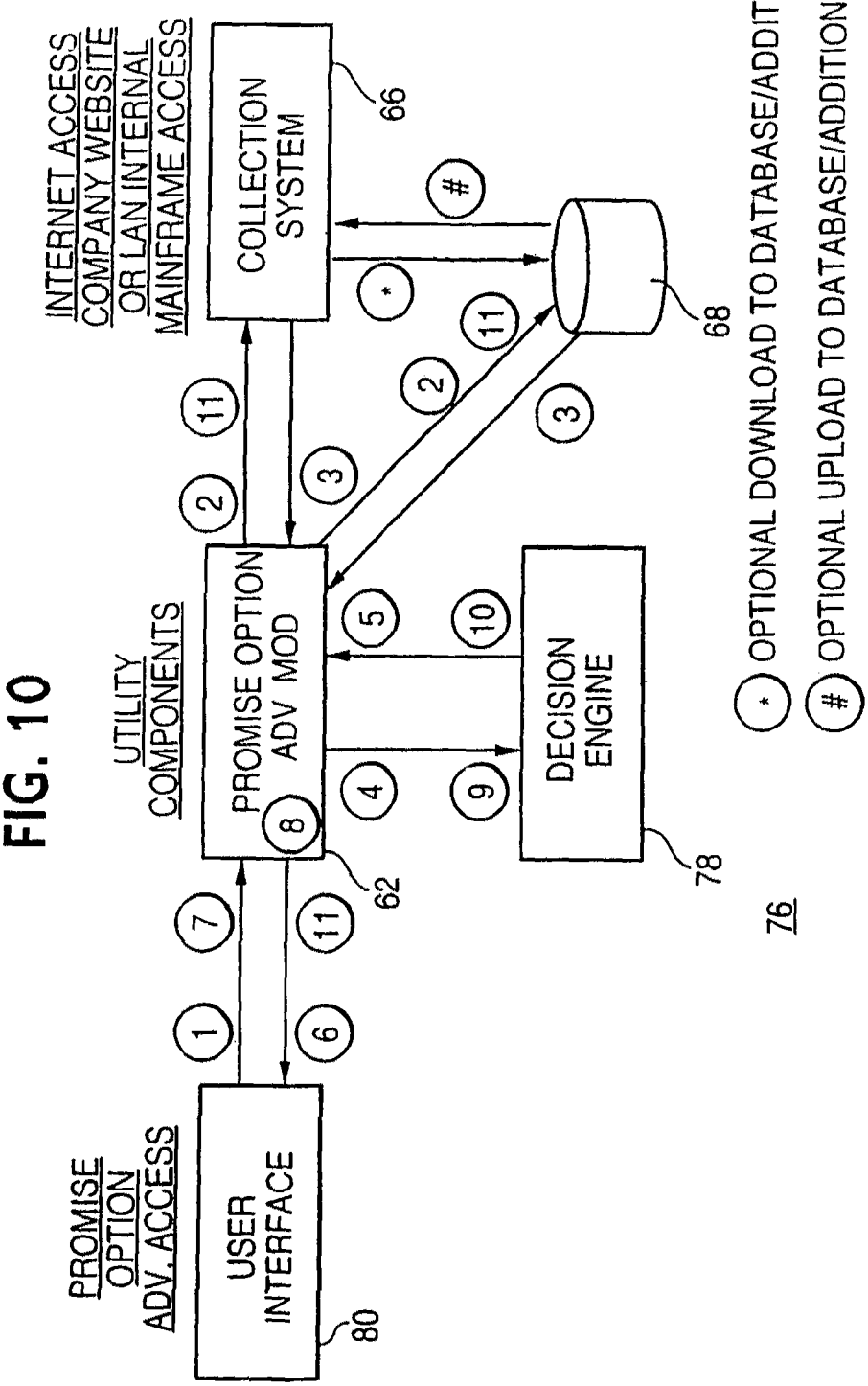

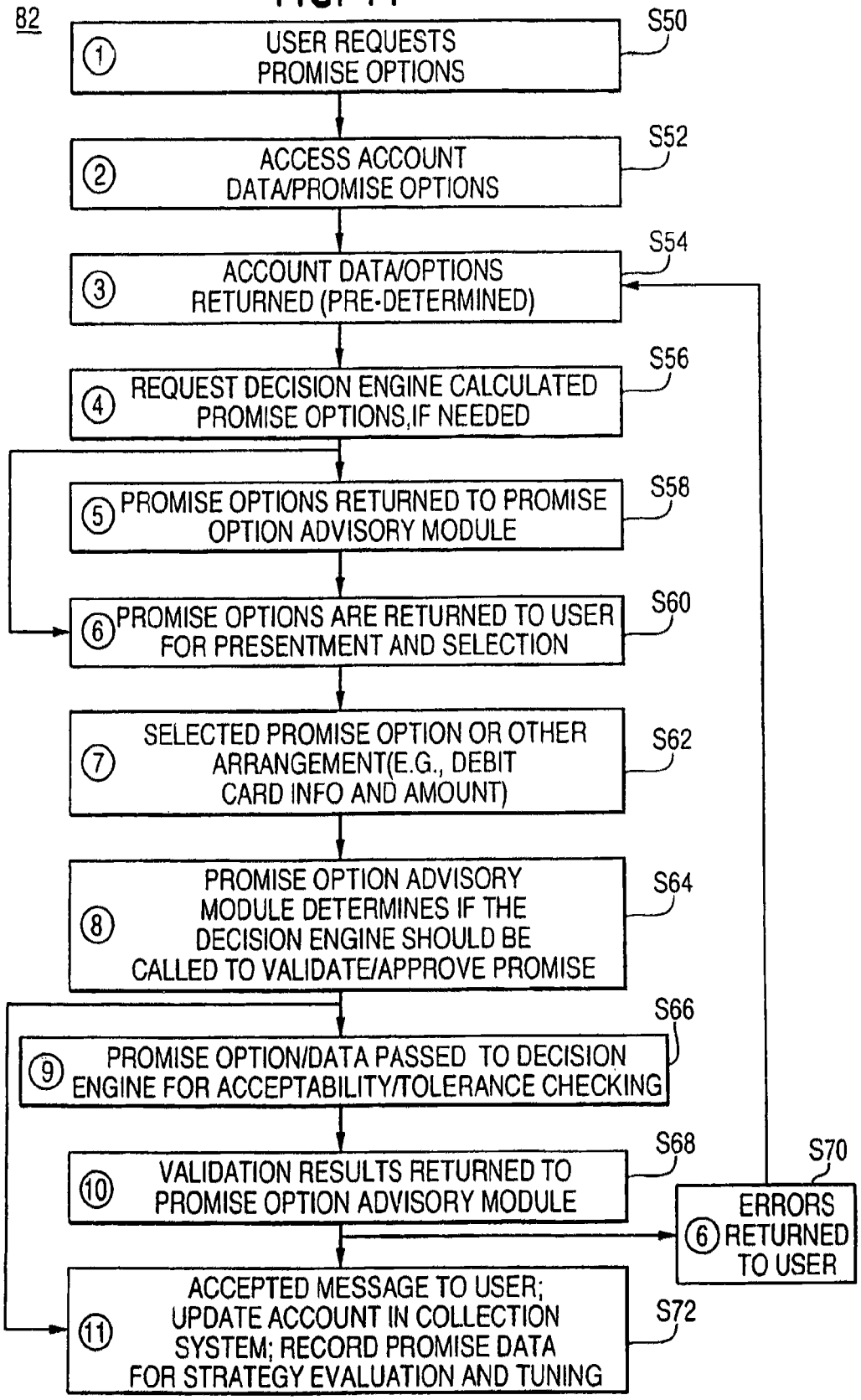

FIG. 12B

EC - Action Dialog

[Action Name]

Activity Details

See the Activity Code design for details about this group

| Promise | Payment Options | History Text | Correspondence/Transaction | Dispute | Settlement |

| Min Promise Amt | Overlimit Amt | Balance Amt | Current Due Amt |
|---|---|---|---|
| 3,200.00 USD | 0.00 USD | 157,000.00 USD | 5500.00 USD |
| 0.00 USD | 0.00 USD | 150,000.00 USD | 1200.00 USD |
| 1,600.00 USD | 0.00 USD | 4000.00 USD | 4000.00 USD |
| 1,000.00 USD | 0.00 USD | 1000.00 USD | 200.00 USD |
| 600.00 USD | 0.00 USD | 2000.00 USD | 100.00 USD |

1213 (CONT.)   1215   1217   1219

Submit & Next    Submit    Cancel

Help

FIG. 12C

EC - Action Dialog

[Action Name]

Activity Details

See the Activity Code design for details about this group

Submit & Next  Submit  Cancel  Help

| Promise | Payment Options | History Text | Correspondence/Transaction | Dispute | Settlement |

Promise 1 Payment Method: [▼]

Promise 2 Payment Method: [▼] — 1207A

| Collection Object | Action Now Amt | Promise 1 Amt | Promise 1 Due Date | Promise 2 Amt | Promise 2 Due Date | Delinquent Amt | Max Promise 1 Due Date | Max Promise 2 Due Date |
|---|---|---|---|---|---|---|---|---|
| Bob Smith - #### | 5,500.00 USD | 0.00 USD | _/_/_ | 0.00 USD | _/_/_ | 6,400.00 USD | 04/05/2007 | 05/05/2007 |
| Home Loan* - #### | 0.00 USD | 0.00 USD | 04/05/2007 | 0.00 USD | _/_/_ | 0.00 USD | 04/20/2007 | 05/20/2007 |
| Mastercard* - #### | 4,000.00 USD | 4,000 USD | 04/05/2007 | 0.00 USD | _/_/_ | 4,000.00 USD | 04/20/2007 | 05/20/2007 |
| Visa* - #### | 1,500.00 USD | 1,500 USD | 04/05/2007 | 0.00 USD | _/_/_ | 1,500.00 USD | 04/20/2007 | 05/20/2007 |
| HELOC* - #### | 0.00 USD | 0.00 USD | _/_/_ | 0.00 USD | _/_/_ | 900.00 USD | 04/20/2007 | 05/20/2007 |

| Collection Object | Action Now Amt | Promise 1 Payment Method: ▼ Promise 1 Amt | Promise 1 Due Date | Promise 2 Payment Method: Promise 2 Amt | Promise 2 Due Date | Delinquent Amt | Max Promise 1 Due Date | Max Promise 2 Due Date |
|---|---|---|---|---|---|---|---|---|
| Bob Smith - #### | 5,500.00 USD | 0.00 USD | / / | 0.00 USD ▶ | / / ▶ | 6,400.00 USD | 04/05/2007 | 05/05/2007 |
| Home Loan* - #### | 0.00 USD | 0.00 USD | / / | 0.00 USD ▶ | / / ▶ | 0.00 USD | 04/20/2007 | 05/20/2007 |
| Mastercard* - #### | 4,000.00 USD | 4,000.00 USD | 04/05/2007 | 0.00 USD ▶ | / / ▶ | 4,000.00 USD | 04/05/2007 | 05/05/2007 |
| Visa* - #### | 1,500.00 USD | 1,500 USD | / / | 0.00 USD ▶ | / / ▶ | 1,500.00 USD | 04/20/2007 | 05/20/2007 |
| HELOC* - #### | 0.00 USD | 0.00 USD | / / | 0.00 USD ▶ | / / ▶ | 900.00 USD | 04/20/2007 | 05/20/2007 |

FIG. 13B

| | Customer Offer | |
|---|---|---|
| | Action Now | Delinquent |
| Smith, Charles - 11 1222333444 | $1,161.00 | $961.00 |
| Revolving Credit | $425.00 | $225.00 |
| MasterCard - 5542123412341234 | $425.00 | $150.00 |
| Visa - 4366123412341234 | $0.00 | $75.00 |
| Line of Credit - 610283412341234 | $0.00 | $0.00 |
| *Fixed Term Credit* | $736.00 | $736.00 |
| Personal Loan - 71012341234 | $736.00 | $736.00 |
| Mortgage - 1000728834 | $0.00 | $0.00 |
| Deposit - Other | $0.00 | $0.00 |
| Money Market - M120007283784 | $0.00 | $0.00 |
| Interest Checking - 600809294 | $0.00 | $0.00 |

FIG. 13C

|  | Customer Offer | |
|---|---|---|
|  | Action Now | Delinquent |
| Smith, Charles - 11 1222333444 | $1,161.00 | $961.00 |
| Revolving Credit | $425.00 | $225.00 |
| MasterCard - 5542123412341234 | $425.00 | $150.00 |
| Visa - 4366123412341234 | $0.00 | $75.00 |
| Line of Credit - 610283412341234 | $0.00 | $0.00 |
| Fixed Term Credit | $736.00 | $736.00 |
| Personal Loan - 71012341234 | $736.00 | $736.00 |
| Mortgage - 1000728834 | $0.00 | $0.00 |
| Deposit - Other | $0.00 | $0.00 |
| Money Market - M120007283784 | $0.00 | $0.00 |
| Interest Checking - 600809294 | $0.00 | $0.00 |

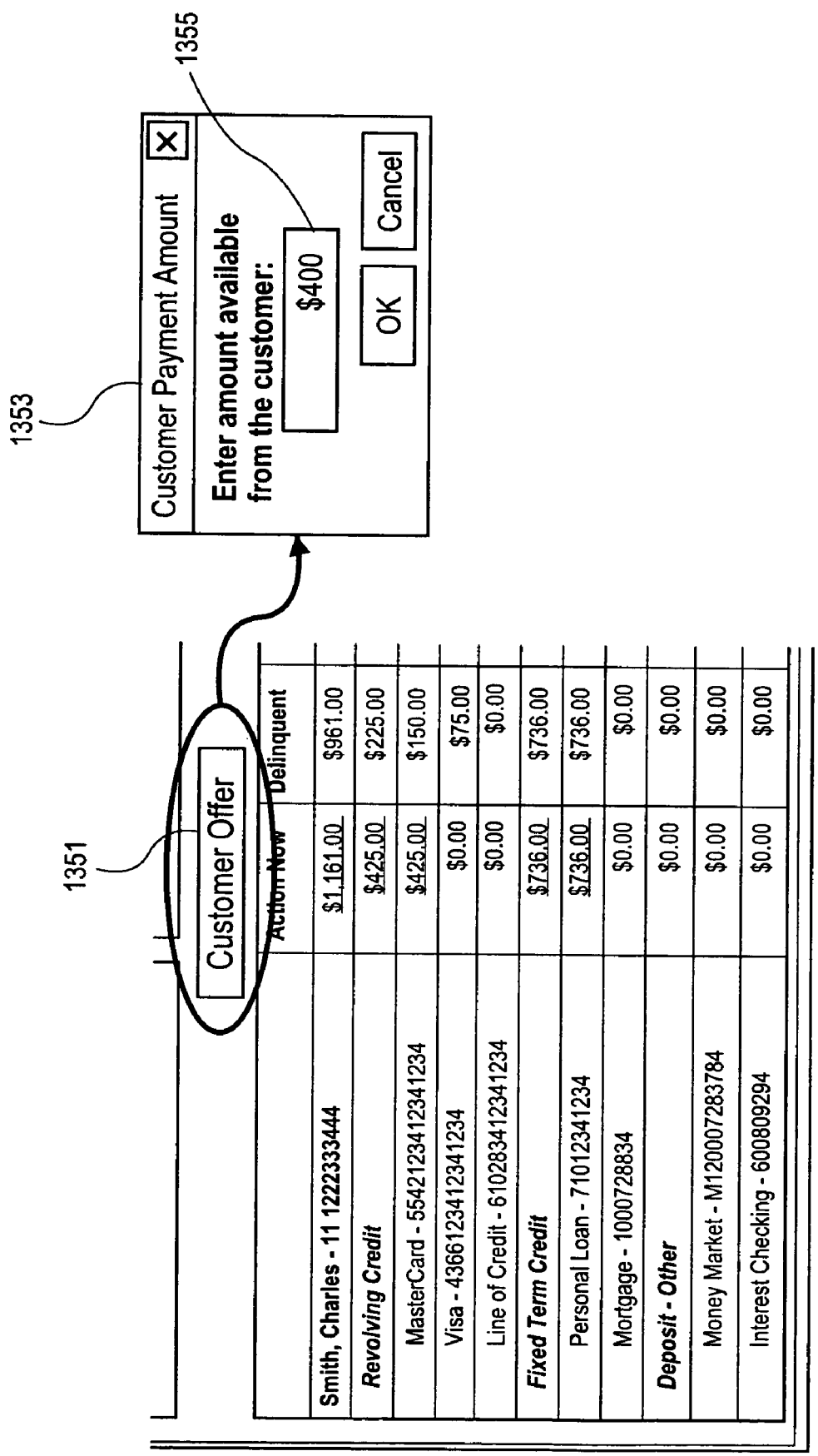

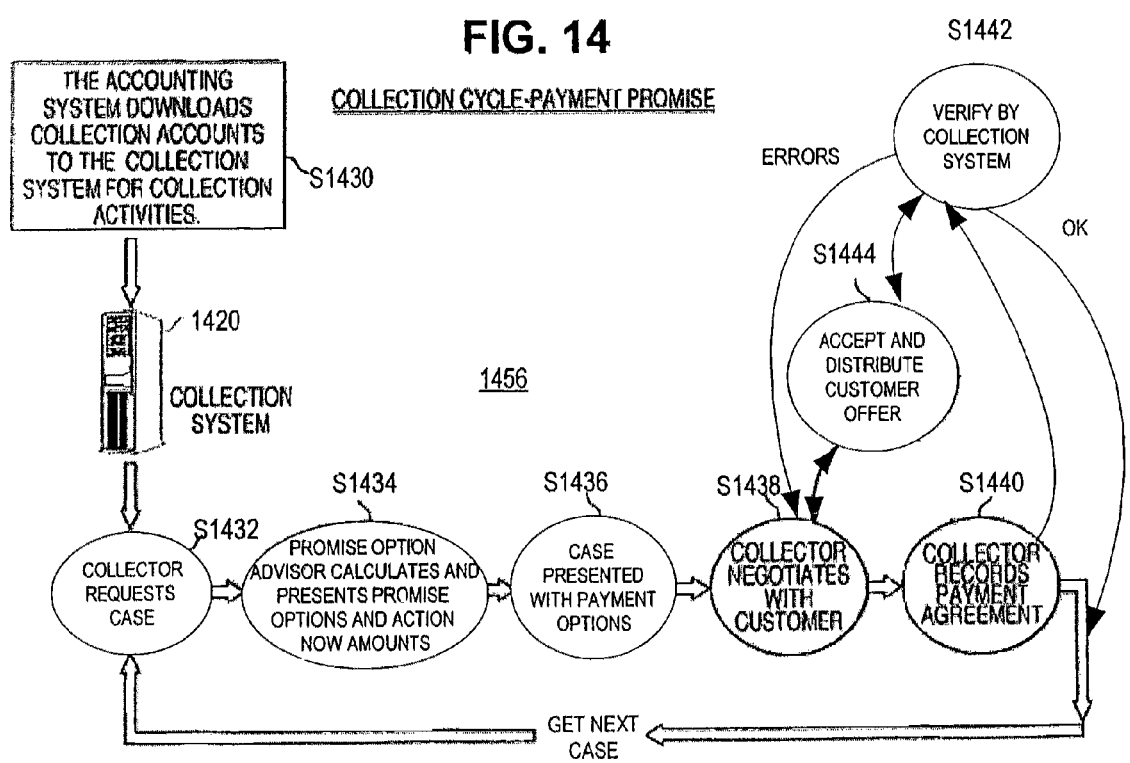

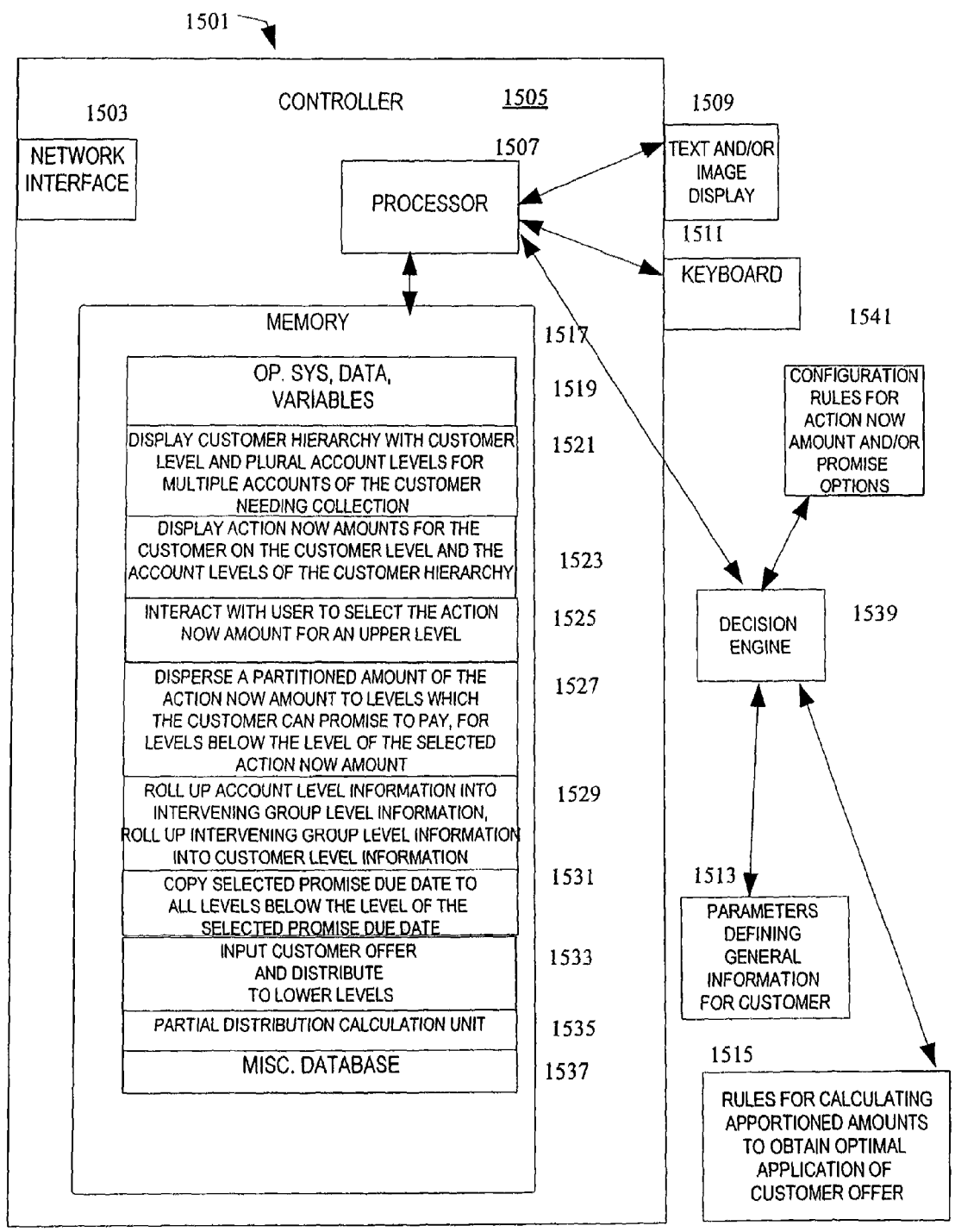

METHOD AND SYSTEM FOR MANAGING CASE BASED PROMISES TO PAY

CROSS-REFERENCE TO RELATED APPLICATIONS

This application is a continuation-in-part of U.S. patent application Ser. No. 09/356,048, filed Jul. 16, 1999, now U.S Pat. No. 7,318,046 titled "COLLECTOR'S ACCOUNT PAYMENT PROMISE OPTION ADVISORY APPARATUS AND METHOD, hereby incorporated in its entirety, and which is related to the following:

This application is related to provisional application Ser. No. 60/076,910, filed Mar. 5, 1998, and which is incorporated herein by reference.

This application is related to U.S. application titled DECISION MANAGEMENT SYSTEM FOR CREATING STRATEGIES TO CONTROL MOVEMENT OF CLIENTS ACROSS CATEGORIES, U.S. Ser. No. 09/217,017, filed Dec. 21, 1998, now U.S. Pat. No. 6,321,206 and which is incorporated herein by reference.

This application is related to U.S. application titled SIMULTANEOUS CUSTOMER/ACCOUNT STRATEGY EXECUTION IN A DECISION MANAGEMENT SYSTEM, U.S. Ser. No. 09/216,985, filed Dec. 21, 1998, and which is incorporated herein by reference.

This application is related to U.S. application titled USE OF ONLINE ANALYTICAL PROCESSING (OLAP) IN A RULES BASED DECISION MANAGEMENT SYSTEM, U.S. Ser. No. 09/217,016, filed Dec. 21, 1998, now U.S. Pat. No. 6,430,545 and which is incorporated herein by reference.

This application is related to U.S. application titled VERSIONING IN A RULES BASED DECISION MANAGEMENT SYSTEM, U.S. Ser. No. 09/219,341, filed Dec. 23, 1998, now U.S. Pat. No. 6,546,545 and which is incorporated herein by reference.

This application is related to U.S. application titled PARAMETER HIERARCHY FOR A DECISION MANAGEMENT SYSTEM, U.S. Ser. No. 09/219,340, filed Dec. 23, 1998, now abandoned, and which is incorporated herein by reference.

This application is related to U.S. application titled DECISION MANAGEMENT SYSTEM WHICH IS CROSS-FUNCTION, CROSS-INDUSTRY AND CROSS-PLATFORM, U.S. Ser. No. 09/219,338, filed Dec. 23, 1998, now U.S. Pat. No. 6,601,034 and which is incorporated herein by reference.

This application is related to U.S. application titled DECISION MANAGEMENT SYSTEM PROVIDING QUALITATIVE ACCOUNT/CUSTOMER ASSESSMENT VIA POINT IN TIME SIMULATION, U.S. Ser. No. 09/258,348, filed Feb. 26, 1999, now U.S. Pat. No. 6,405,173 which is incorporated herein by reference.

TECHNICAL FIELD

The technical field relates to a computer assisted credit management system including a collection system, a decision engine, and a promise management system, and, more particularly, to a promise management system which interfaces to the decision engine and to the collection system and which recommends payment promise terms to the user of the system.

BACKGROUND

Description of the Related Art

Computer assisted credit management systems, including computer assisted collection systems, are known in the art. Generally, a collection system, such as a full collections system, may include a variety of components, such as a Collection Engine, a Decision Engine, a User Interface (for either a collector or customer), and other components. A collector is a user of a collection system whose primary job is to use a collection system to facilitate collecting payments on accounts needing collection action, such as delinquent accounts, overlimit accounts, special status accounts, etc. Collection systems generally include parameters, such as collection policy parameters. Collection policy parameters are used by credit granting institutions to specify how a collection system implements the collection policy of the credit granting institution.

Examples of computer assisted collection systems include the Computer Assisted Collection System™ (or CACS®), by American Management Systems, Inc. (AMS), and its several versions including CACS® Enterprise, Computer Assisted Collection System™ for Government (including TRACE™), and CACS®-Telecom.

CACS® Enterprise is explained in the CACS® Enterprise Product Profile, March 1998 by AMS, incorporated herein by reference. Prior versions of computer assisted collections systems such as CACS® Enterprise have been in use for many years, with the CACS® Baseline having been in use since approximately 1984, with approximately 200 collections organizations worldwide using various interfaces, such as a CACS® Enterprise 3270 interface, an AS/400™ interface, and PowerBuilder™ (for CACS®-T and CACS®-G).

CACS® Enterprise, such as CACS® Enterprise 7.0, is a member of the AMS series of credit management software that supports all phases of credit operations, from initial application processing through servicing and accounting to collections. Available exclusively through AMS, each system can be installed individually, collectively, or in any combination to address evolving support requirements.

The Computer Assisted Collection System™ for Government is explained in the CACS Plus® Product Profile (Client/Server version) by AMS, August 1997, and incorporated herein by reference. CACS® Telecom is explained in the CACSe-Telecom Product Profile by AMS, September 1998, incorporated herein by reference. In addition, there are mainframe versions of CACS®, having a 3270 interface thereto, such as TRACE.

Computerized tracking of promises to pay is also known in the art. CACS® Enterprise records promises to pay. More particularly, CACS® Enterprise supports recording of promises on collection accounts.

In the computer assisted collection systems of the related art, such as CACS® Enterprise, the user (for example, the collector), provides the system with arrangements of repayment of an outstanding debt, referred to as promises to pay, by the account holder. CACS® Enterprise relies on customer account data and collection parameters entered into the collection system by the system administrator to validate reactively the collector-entered promise terms, including promise amounts, dates, and schedules.

Generally, in the computer assisted collection system of the related art, the arrangements of the promises to pay (such as payment amount and frequency of payment) are negotiated between the collector and the account holder, and are then input into the computer assisted collection system of the related art for verification against criteria previously established and provided therein. If the negotiated arrangements of the promises to pay are not within the criteria provided in the computer assisted collection system, an error message is displayed to the collector indicating that the arrangements are not accepted by the computer assisted collection system. The collector must then re-negotiate the arrangements with the account holder, and enter the re-negotiated arrangements into the computer assisted collection system for verification.

The process of negotiation and verification continues until the arrangements of the promises to pay are acceptable to the collector, the account holder, and the computer assisted collection system.

FIG. 1 shows an example of a collection cycle 12 for a payment promise using CACSe Enterprise, as an example using a collection system 20 of the related art. The collection system 20 of the related art may be provided in a mainframe or a client/server environment.

As shown in FIG. 1, in operation S10, an accounting system downloads collection accounts to the collection system 20 of the related art for collection activities. Then, in operation S12, the collector requests of the collection system 20 an account. Based upon the account returned from the collection system, in operation S14, the collector then negotiates with the customer (or account holder) the arrangements of the promise to pay. Next, in operation S16, the collector records in the collection system 20 the payment arrangements (or agreement) reached with the customer. The collection system 20 then verifies whether the payment arrangements meet the criteria provided in the collection system 20, as shown in operation S18. If there are errors in the payment arrangements (i.e., the payment arrangements do not satisfy the collection parameters stored in the collection system), then the part of the collection cycle of the prior art beginning with operation S14 is repeated until there are no errors in the payment arrangements.

In the meantime, control is returned to operation S12 and the next account is obtained by the collector from the collection system.

FIG. 2 shows a screen layout 30 from a current CACS® Enterprise 3270 mainframe display, for a particular account. As shown in FIG. 2, the screen layout 30 includes account holder demographics 32, account summary data 34, account data view and scripts (including information such as the date the account was opened, the credit limit, the date of the last bill, the balance, the amount in dispute, the total amount due currently, the amount that is over the credit limit, the amount that is late, and the aged data) 36, and an account history 38 (including previously-made promises) which includes an area for the collector to interact with the collections system.

Promises in CACS® Enterprise are now discussed. Collectors can make arrangements with account holders for one or two payments (standard promises), or for a series of weekly, bi-weekly, or monthly payments (long-term promises or deferred payment arrangements). Standard and long-term promises, as well as deferred payment arrangements, are described in further detail in the following paragraphs.

Standard Promises

The CACS® Enterprise mainframe screen display includes a Coded Collection History line having fields such as PROMISE 1 and PROMISE 2. Collectors may enter a single promise by filling an amount and date in the PROMISE 1 fields of the Coded Collection History line. Collectors may enter two promises by filling in both the PROMISE 1 and PROMISE 2 fields. CACS® Enterprise validates the promise amount and date entered according to parameters entered in management control tables.

Long-Term Promises

CACS® Enterprise considers any payment arrangement extending for more than two payments as a long-term promise. To enter long-term promises, collectors enter the amount and date of the first payment, along with the amount of the long-term promise amount for the weekly, biweekly or monthly payment.

Deferred Payment Arrangement

A Deferred Payment Arrangement (DPA) is another type of promise CACS® Enterprise supports. Collectors set up a DPA to record a weekly, biweekly, or monthly promise for the current bill plus an agreed upon monthly payment which is applied to the outstanding delinquency.

In a typical collection system of the related art, delinquent accounts are arranged into groups, then into queues within the groups, in accordance with rule-based criteria. Each collector is provided by the collection system with a next account from a particular queue. For example, CACS® Enterprise divides accounts into groups based upon parameters such as front end parameters, midrange parameters, and other group parameters, which are discussed herein below.

Queues of accounts are also built by CACS®. The queues include accounts requiring the same next action, e.g., send a letter, contact customer for a payment promise. Rules are defined to control the movement of accounts between queues. Queues are defined for special purposes, such as supervisor review. If a collector cannot come to acceptable terms within parameters on a payment promise, the account is routed to a supervisor queue for out-of-tolerance promise approval/denial. Approved payment promises are put into the proper queue to wait for promise fulfillment; denied payment promises are returned to the collector for re-work.

Known in the art are systems which offer recommendations of promises for a particular account using a single account's data. More particularly, known in the art is a promise advising system in which a decisioning component evaluates and recommends suggested payments based on decision trees. Decision trees, or decision engines, are also known in the art.

A concept previously proposed, although not embodied, includes a promise advising process which evaluates and presents recommended payment amounts using account and/or customer data.

A problem with credit management systems, and collection systems in particular, of the related art is that several iterations between the collector and the account holder may be necessary to establish an arrangement of payment acceptable to the collector, the collection system, and the account holder, because the related art collection systems verify payment promises entered by the collector against predetermined criteria as a reactive check. Therefore, reaching agreement between the collector, the collection system, and the account holder is a hit or miss process.

Another problem with credit management systems, and collection systems in particular, of the related art is that payment promise options are not presented to the collector by the collection system prior to negotiations between the collector and the account holder.

Still a further problem with systems of the related art is that recommended best payment options are not offered.

A further problem with credit management systems, particularly with collection systems, of the related art is that a collector must first enter a promise date and amount, and submit same to the collection system for validation of keying errors and collection policy adherence, without knowing whether the promise date and amount adhere to the collection policy provided in the collection system.

SUMMARY

Accordingly, one or more embodiments provide a method of managing case based promises to pay. The method includes displaying a customer hierarchy, wherein the customer hierarchy displays (i) a customer level with customer level information and (ii) plural account levels with account level information for respective multiple accounts of a customer needing collection. The method also includes displaying action now amounts for the customer on the customer level and on the account levels of the customer hierarchy, wherein the account level information is rolled up into the customer level information. Further, the method includes interacting with a user to select the action now amount for an upper level in the customer hierarchy, and dispersing a partitioned amount of the action now amount to levels which the customer can promise to pay, for levels which are hierarchically below the level of the selected action now amount in the customer hierarchy.

Further embodiments provide a computer-implemented system for managing case based promises to pay, including a display operable to receive screens to be displayed to a user; and a processor cooperatively operable with the display. The processor is configured to facilitate displaying a customer hierarchy, wherein the customer hierarchy displays (i) a customer level with customer level information and (ii) plural account levels with account level information for respective multiple accounts of a customer needing collection. The processor is further configured for displaying action now amounts for the customer on the customer level and on the account levels of the customer hierarchy, wherein the account level information is rolled up into the customer level information. Also, the processor is configured for interacting with a user to select the action now amount for an upper level in the customer hierarchy, and dispersing a partitioned amount of the action now amount to levels which the customer can promise to pay, for levels which are hierarchically below the level of the selected action now amount in the customer hierarchy.

Still other embodiments provide a computer-readable medium comprising instructions being executed by a computer. The instructions include a computer-implemented method of managing case based promises to pay. The instructions include displaying a customer hierarchy, wherein the customer hierarchy displays (i) a customer level with customer level information and (ii) plural account levels with account level information for respective multiple accounts of a customer needing collection. The instructions also include displaying action now amounts for the customer on the customer level and on the account levels of the customer hierarchy, wherein the account level information is rolled up into the customer level information. Furthermore, the instructions include interacting with a user to select the action now amount for an upper level in the customer hierarchy, and dispersing a partitioned amount of the action now amount to levels which the customer can promise to pay, for levels which are hierarchically below the level of the selected action now amount in the customer hierarchy.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE DRAWINGS

These and other objects and advantages of the invention will become apparent and more readily appreciated from the following description of the preferred embodiments, taken in conjunction with the accompanying drawings of which:

FIG. 1 is a flowchart showing the collection cycle establishing a payment promise using collection systems of the related art;

FIG. 2 is a diagram of a collection system display screen for a 3270 mainframe display of the related art;

FIGS. 3A, 3B, 3C, and 3D show variations of a promise management screen 30, including promise option advisory group boxes, included in and displayed by the promise management system;

FIGS. 4A, 4B, 4C, and 4D show options provided in drop-down lists of the promise management screens shown in FIGS. 3A, 3B, 3C, and 3D;

FIGS. 5A and 5B show promise options and lists of definitions of the promise options executed by the promise option advisory module;

FIG. 7 is a flowchart 56 of a collection cycle, including a payment promise, in which the promise management system is used;

FIG. 10 is a data flow diagram showing data flow in a preferred architecture of a computer system 76 implementing the promise option advisory module 62;

FIG. 11 is a flowchart 82, related to, and explaining, the data flow diagram of FIG. 10;

FIGS. 12A-12D are illustrations of portions of an exemplary user interface;

FIGS. 13A-13E are illustrations of portions of another exemplary user interface;

FIG. 14 is an illustration of a flowchart of a collection cycle including case based promises to pay;

FIG. 15 is a block diagram illustration portions of an exemplary computer system;

FIG. 16 is a flowchart illustrating an exemplary procedure for managing case based promises to pay; and.

DETAILED DESCRIPTION

Figure 6:
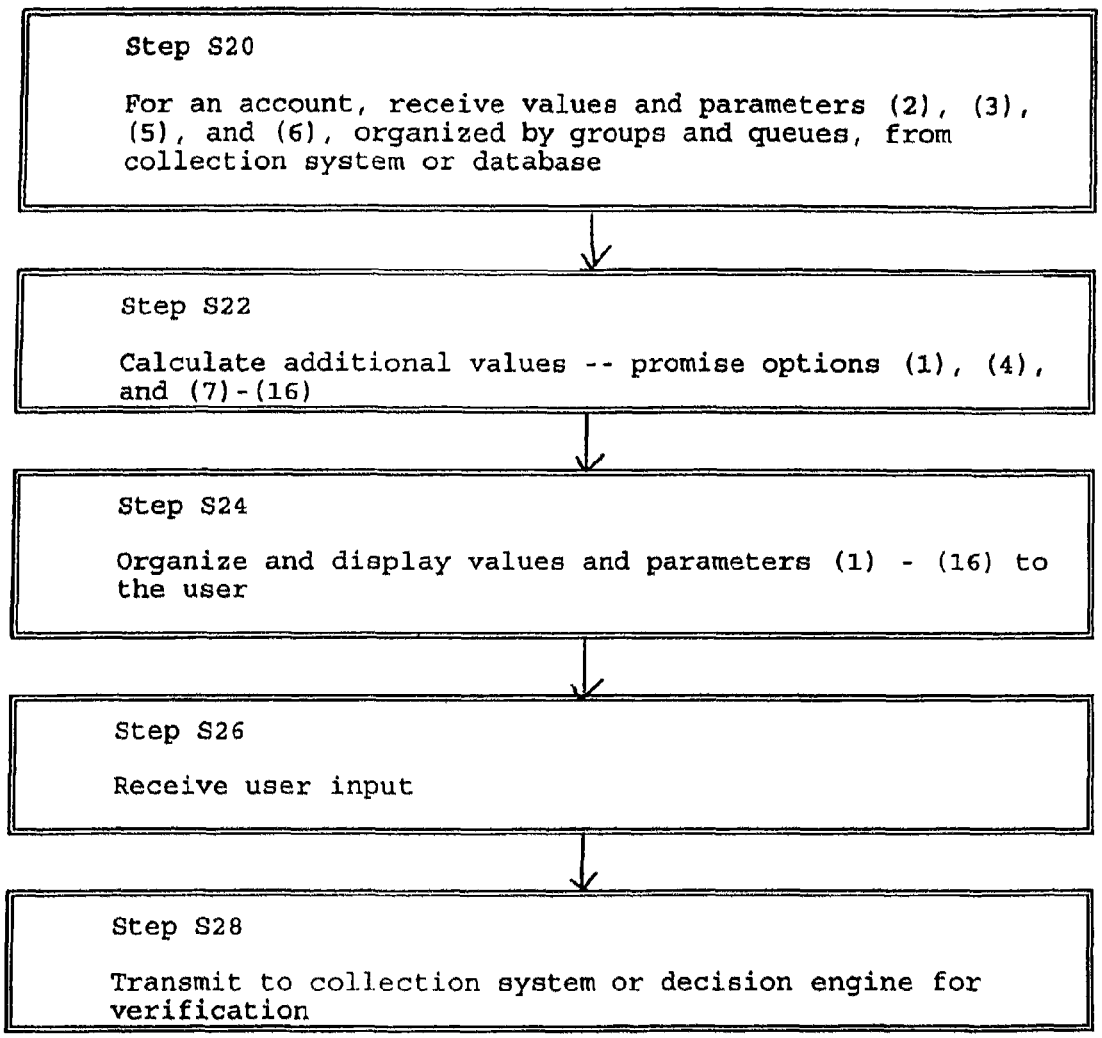
FIG. 6 is a flowchart 54 of the functions executed for each account by the promise option advisory module.

Reference will now be made in detail to the embodiments, examples of which are illustrated in the accompanying drawings, wherein like reference numerals refer to the like elements throughout. The embodiments are described below by referring to the figures.

A payment promise is a commitment made by an account holder to a collector for payment by the account holder of money owed. The payment promise can include many options, but typically includes an amount of money owed and frequency of payments as two of those options. To speed up negotiating and recording of mutually-agreeable payment promises, a computer-based promise management system proactively calculates, by a promise option advisory software module of the promise management system, available promise options using customer account data and collection parameters entered into the collection system by the system administrator.

The promise management system, through the promise option advisory module included therein, uses account data, drawn from multiple accounts of the customer, and/or customer data (which is data about the customer relationship (also referred to as relationship-specific information)), to recommend promise options for that customer, as discussed herein below more specifically with reference to FIGS. 5A and 5B. A decision engine coupled to the promise option advisory module, prepares and presents to the promise option advisory module, a recommended best payment option based upon the relationship-specific information; other promise options are determined by the promise option advisory module based upon data stored in a database or a collection system coupled thereto.

Accordingly, account data about a customer is not confined to a single account of the customer, but includes data from the multiple accounts of the customer and the relationship-specific information. Thus, the promise option advisory module interfaces to a decision engine (which calculates the recommended best and minimum promise and validates a user-entered promise) and, optionally, to a collection system, to transmit and receive various data, as described herein below.

By proactively recommending valid payment promise terms and a recommended best or minimum payment option, and allowing the collector to record the suggested promise, for example by selecting the suggested promise using a push-button, the promise management system reduces the incidence of errors and the overall time required to solicit and record a payment promise that is within credit policy guidelines.

The promise management system operates in conjunction with a collection system of the related art and includes a graphical user interface (GUI) which displays a promise management screen, in the form of a promise management action dialog, to the user when the user selects a Promise tab displayed on a collection display screen.

The promise management portion of the action dialog includes several group boxes, described in detail herein below, including a promise option advisory group box which presents to the user predetermined promise options including minimum promise amount, maximum promise date, delinquent amount, current amount due, balance on account, over-limit amount, recommended best promise amount, and recommended best promise date. As described herein below, the minimum promise amount and the maximum promise date are calculated by a promise option advisory module based upon other promise options which are stored in and retrieved from the collection system (or from a separate database accessible by both the collection system and the promise option advisory module).

The recommended best promise amount is the amount that the customer should ideally pay based on decision logic, including account data drawn from multiple accounts of the customer, customer data, credit granting institution policy, etc. Likewise, the recommended best promise date is the date on which the customer should ideally pay based on the above-mentioned decision logic.

The users may include a collector, the account holder, or other types of users as will be apparent from the description below. For the purposes of the following discussion with reference to FIGS. 3A, 3B, 3C, and 3D, the user will be referred to as the collector. In addition, the prior art collection system referred to is the CACS® Enterprise system. However, other collection systems may be used in place of, or in conjunction with, the CACS® Enterprise system.

FIGS. 3A, 3B, 3C, and 3D show examples of variations, respectively, of a promise management action dialog 40 included in and displayed by the promise management system. As explained in further detail herein below, the promise management action dialog 40 includes promise data displayed when a promise tab is selected on the promise management action dialog 40. The promise management action dialog includes promise option advisory group boxes, which may vary depending upon whether a single promise (FIG. 3A), a two-part promise (FIG. 3B), a long-term promise (FIG. 3C), or a deferred promise arrangement (FIG. 3D) is selected in the promise management action dialog.

As shown in FIGS. 3A, 3B, 3C, and 3D, the promise management action dialog 40 is displayed on a computer display 41 when, for example, the collector receives an incoming telephone call and the collector is using a computer system which includes the promise management system. The computer display 41 may be part of a standalone personal computer, a personal computer which is part of a client-server network, or a terminal coupled to a mainframe computer.

The promise advisor action dialog is now explained with reference to FIGS. 3A, 3B, 3C, and 3D. The promise option advisory group boxes which are shown in common in FIGS. 3A, 3B, 3C, and 3D are explained with reference to FIG. 3A, and the explanations of same are not repeated for FIGS. 3B, 3C, and 3D. Further, in the following explanations, reference is made to promise options (1) through (16), either individually or collectively. Promise options (1) through (16) refer to the promise options (1) through (16) shown in FIGS. 5A and 5B.

The promise management system downloads customer data, account data, and collection parameters retrieved from the collection system, to the collector's computer when retrieving an account for collections work.

As shown in FIGS. 3A, 3B, 3C, and 3D, all activities on an account are recorded on the promise management action dialog 40 through the group boxes 42, 46, 48, and 50, as explained. The promise management action dialog 40 also includes tabs such as Promise, Correspondence, and History Text. Selection of the Promise tab 44 displays the promise management action dialog. The Promise tab 44 is the promise advisor information group selector, and further displays a detail group of items based upon the type of promise selected by the user.

Detail Group box 42 displays fields including the place of contact of the account holder, the party contacted, the disputed amount, the route to state indicating which queue to route the resulting account to for promise approval or receipt of payment, the hold date, the excuse, and the time for scheduling another call. Each of the foregoing fields is populated by the user based upon information received from the account holder.

Several of the fields included with the detail group box 42, such as Party Contacted 42-1, Place of Contact 42-2, Route to State 42-3, and Excuse 42-4, can be populated through user selection of dropdown lists as shown in FIGS. 4A, 4B, 4C, and 4D, respectively. The options presented on the dropdown lists 42-3 and 42-4 shown in FIGS. 4C and 4D, respectively, are customizable by the system administrator. Also included are fields 42-5, which accepts entry of the disputed amount, 42-6 which accepts entry of the hold date, and 42-7 which is used to enter a call back time.

The promise option advisory tab is shown as the selected tab 44 in the promise management action dialog 40. Selection of the promise option advisory tab 44-1 initiates display of a promise option advisory group box 46, a Promise Type group box 48, and Promise Details group box 50. As explained in detail herein below, the fields displayed within the Promise Details group box 50 vary, depending upon the Promise Type selected in group box 48.

A user, such as a collector, opens the promise option advisory group box 46 by selecting (using, for example, a mouse) the promise option advisory tab 44-1. Preferably before, but at least in response to, selecting the promise option advisory tab 44-1, the promise option advisory module is executed.

The promise option advisory group box 46 displays promise option advisory fields including minimum promise amount 46-1, maximum promise date 46-2, delinquent amount 46-3, current amount due 46-4, balance on account 46-5, overlimit amount 46-6, Recommended Promise 1 amount 46-7, and Recommended Promise 1 date 46-8. The promise option advisory fields are populated by the promise management system upon display of the promise management action dialog 40 to the user, in accordance with the collection policy or guidelines entered into the collection system (such as CACS® Enterprise) to which the promise management system interfaces. The promise option advisory module determines the minimum promise amount 46-1 and the maximum promise date 46-2, respectively, consistent with promise options (1) and (2) shown in FIG. 5A. A decision engine coupled to the promise option advisory module provides the data populating the Recommended Promise 1 amount 46-7 and the Recommended Promise 1 date 46-8, in accordance with FIGS. 5A and 5B.

To record a promise, the promise management system uses the customer data (including the customer relationship information), the account data, and the collection system parameters (including parameters stored in an accounting system) to calculate the promise options --particularly the minimum promise amount 46-1, the maximum promise date 46-2, the recommended promise 1 amount 46-7, and the recommended promise 1 date 46-8, shown as promise option advisory fields in the promise management action dialog 40. These promise options and their respective definitions are shown in FIGS. 5A and 5B. More particularly, promise option (1) of FIGS. 5A and 5B corresponds to field 46-1 of FIGS. 3A-3D, promise option (4) corresponds to field 46-2, promise option (7) corresponds to field 46-7, promise option (8) corresponds to field 46-8, promise option (9) corresponds to field 46-9, promise option (10) corresponds to field 46-10, promise option (11) corresponds to field 46-11, promise option (12) corresponds to field 46-12, promise option (13) corresponds to field 4613, promise option (14) corresponds to field 46-14, promise option (15) corresponds to field 46-15, and promise option (16) corresponds to field 46-16.

In the promise management system, the promise option advisory module presents the promise options as pushbuttons 46-1 through 46-16 on the promise option advisory group box 46 displayed upon selection of the promise option advisory tab. This presentation allows collectors to record quickly in the promise detail group box 50 a suggested promise by selecting the push button instead of manually entering the promise. When the minimum promise amount push-button 46-1 or the recommended promise amount 1 pushbutton 46-7 is selected, the promise option advisory module prefills the selected amount into the corresponding promise amount field 50-1A in the Promise 1 Detail group box 50-1, as shown in FIGS. 3A, 3B, and 3C, or Amount field 50-4A in the Down Payment Information group box 50-4 as shown in FIG. 3D.

In the promise management system, the user can override the promise options populated by the promise management system of the system as discussed herein below, by inputting a user-decided value into the corresponding promise option fields shown in FIGS. 3A, 3B, 3C, and 3D.

The Promise Type dialog box 48 provides several options for categorizing promises, including a single promise 48-1, a two part promise 48-2, a long term promise 48-3, and a deferred payment arrangement 48-4. The Promise Details group box displays a variety of different fields in which the promise details are input, depending upon which promise type is selected by the user in the Promise Type dialog box 48.

A single promise option is shown in FIG. 3A. A single promise includes one promise amount 50-1A and one promise date 50-1B, as shown in the Promise Details group box 50-1. If a promise option other than a single promise were to be selected using the Promise Type Group box 48, then promise details corresponding to the promise option selected would be displayed in the Promise Details group box 50.

If the user selects a two-part promise using the Promise Type group box 48, then the user must enter the requested data (including a second promise amount 50-2A and a second promise date 50-2B) in the Promise 2 Detail group box 50-2, as shown in FIG. 3B. The second promise amount 50-2A and the second promise date 50-2B are respectively populated either by the user entering data into each of the foregoing fields, or by selecting the recommended promise amount 2 pushbutton 46-9 and the recommended promise date 2 pushbutton 46-10, which are determined by the promise option advisory module consistently with promise options (9) and (10), shown in FIG. 5B.

Likewise, if the user selects a long-term promise using the Promise Type group box 48, then the user must enter the requested data (including long term promise amount 50-3A, frequency 50-3B, and day 50-3C) in the Long Term Promise group box 50-3, as shown in FIG. 3C. More particularly, if a long term promise option were to be selected in the Promise Type Group box 48, in addition to entry of the Promise 1 Details 50-1 (amount 50-1A and date 50-1B) as a down payment, the long term promise amount 50-3A and the options for the frequency of payments 50-3B, such as weekly, bi-weekly, monthly, etc., and long-term promise amount promise day of the month 50-3C (if needed) would be displayed in the Promise Details group box 50-3. The Promise amount 50-3A, the frequency 50-3B, and the day 50-3C are populated either by the user entering data therein, or by the user selecting the Recommended long-term payment amount pushbutton 46-11, the recommended frequency amount pushbutton 46-12, and the recommended day pushbutton 46-13. The values presented by the promise option advisory module in fields 46-11, 46-12, and 46-13 are determined as described for promise options (11), (12), and (13), respectively, described with reference to FIG. 5B.

Similarly, if the user selects a Deferred Payment Arrangement using the Promise Type group box 48, then the user must enter the requested data (including payment amount 50-5A, frequency 505C, and number of payments 50-5B) in the Deferred Payment Arrangement group box 50-5, as shown in FIG. 3D. The above-mentioned fields 50-5A through 50-5C are populated either by the user entering in the requested data, or by the user selecting the recommended deferred payment arrangement (DPA) pushbutton 46-14, the recommended frequency pushbutton 46-15, and the recommended number of payments pushbutton 46-16, respectively. The values presented by the promise option advisory module in fields 46-14, 46-15, and 46-16 are determined as described for promise options (11), (12), and (13), respectively, described with reference to FIG. 5B. The Total amount field 50-5D is a display-only field which displays the total amount due. The total amount due is received by the promise option advisory module and is equal to the delinquent amount (received from the collection system or database) minus a disputed amount.

Alternatively, if data is not entered in one of the Payment amount (50-5A), Frequency (50-5C), or # of payments (50-5B) fields, upon selection of the Calculate 50-5E pushbutton, the promise option advisory module calculates the missing data using the above-mentioned data (50-5A and 50-5B, 50-5A and 50-5C, or 50-5B and 50-5C) which has been entered, and displays the calculated data to the user in the respective fields.

Most typically, if the promise is non-standard and not one of the promise options recommended by the promise option advisory module, the user would then indicate using the Route to state field 42-3 of dialog box 42 a queue to which the account with promise details is routed. An example of a queue would be a supervisor queue for approval of the user-decided values.

Details of the correspondence tab and the history text tab are not shown in FIGS. 3A, 3B, 3C, or 3D. Briefly, though, the Correspondence tab indicates correspondence available to be sent to the account holder, and the History text tab includes a text entry area to add comments related to the activity.

Also included in the promise management action dialog 40 shown in FIGS. 3A, 3B, 3C, and 3D are buttons 52, such as Submit Action and Get Next, Submit Action, and Cancel. Cancel closes the action dialog 40. Submit Action and Get Next submits the completed promise management action dialog 40 to the collection system for review, action, and recordation on the account, and then retrieves the next account allocated to the current collector. Selection of the Submit Action button has the same function as selection of the Submit Action and Get Next button, but does not retrieve the next account.

Account data is now explained in further detail. The promise option advisory module uses all available account data, including both customer-level data (such as the above-mentioned relationship-specific information) for the customer and data drawn from multiple accounts of the customer, to recommend a promise option that is in the best interest of the financial institution and the customer and which follows the credit granting institution's current policy as implemented in the promise management system. Accordingly, the promise option advisory module makes promise recommendations based on all known, available information about the customer.

To determine the promise options for a customer presented to a user, the promise option advisory module analyzes the data from the multiple, individual accounts of the customer, then analyzes the relationship-specific information for the customer, to determine an optimal promise payment strategy, which is reflected in the recommended best payment option of the promise options presented to the user for a particular customer.

For each customer, analysis by the promise management system, when coupled to a decision engine, includes all or a portion of the following functions, the calculations and determinations for which are performed by the decision engine:

a.) devising strategies to bring all of the multiple, individual accounts up to date over a period of time;

b.) determining which of the multiple, individual accounts should be brought up to date first based on balance or risk of an individual account as compared to other individual accounts;

c.) implementing the credit granting institutions collection strategy (e.g., reduce mortgage delinquency first); and d.) comparing profitability of each of the multiple, individual accounts.

The promise option advisory module then performs additional analysis of the account data for a customer based upon customer level data (or relationship-specific data), to recommend the optimal promise payment strategy. The additional analysis based on customer level data includes past and future customer value/profitability, risk of additional delinquency, likelihood of attrition, likelihood of a customer accepting a particular promise scenario, and follow through on previous accepted payment plans.

All of the above-mentioned components of the account data can be weighted and analyzed in accordance with criteria established within the promise management system, in accordance with credit policy guidelines of the institution managing the promise management system.

FIGS. 5A and 5B show promise options and their respective list of definitions implemented by the promise option advisory module on data from one of the multiple accounts for a customer. The promise options, determined by the promise option advisory module for each of the multiple accounts based on the list of definitions, are then compared to each other, across all of the multiple accounts for the customer, and to the relationship-specific information, before promise options are recommended to the user as explained herein above.

FIGS. 5A and 5B refer to the list of definitions included in decision logic. The decision logic considers account parameters, customer data, credit granting institution policy, and other factors in determining the recommended promise arrangements. Typically this logic may differ from implementation to implementation based on a client's customer portfolio, performance, profitability, and the institution's collection strategy. One possible implementation may be to create a risk score (as determined by a scoring model) based on historical account data, comparing the data for similar accounts and each account's likelihood of continued delinquency or write-off. One skilled in the art could create decision logic based on the historical data for the creation of a risk score that would be used to determine promise arrangements. Typically, decision logic changes over time as more sophisticated risk modeling techniques are used, and the demographics for the account base change. It is expected that these new models and techniques would be supported in a system such as the Strata™ Decision Support System (discussed herein below) to continue to support the promise option advisory module decisioning, and support the clients' collection strategies.

Referring now to FIGS. 5A and 5B, the Minimum Promise Amount (1), and the Maximum Promise Date (4) promise options are calculated by the promise option advisory module, the Recommended Promise 1 Amount (7), the Recommended Promise 1 Date (8), the Recommended Promise 2 Amount (9), the Recommended Promise 2 Date (10), the Recommended Long Term Promise Amount (11), the Recommended Long Term Promise Frequency (12), the Recommended Long Term Day (13), the Recommended Deferred Payment Arrangement Amount (14), the Recommended DPA Frequency (15), and the Recommended DPA Number of payments (16) promise options are calculated by a decision engine coupled to the promise option advisory module, upon selection by the user of the promise option advisory tab. The foregoing promise options (1), (4), and (7)-(16) are referred to as calculated promise options. The Recommended Promise Amount (7) and the Recommended Promise 1 Date (8) (and, variously, if applicable as shown in FIGS. 3A-3D, promise options (9) through (16) of FIGS. 5A and 5B) are referred to as a recommended best payment option, and, together form an optimal promise.

The rest of the promise options (2), (3), (5), and (6) shown in FIGS. 5A and 5B are received by the promise management system from a collection system interfaced thereto, such as, for example, the CACS® Enterprise collection system, or are stored in a data base included in or interfaced to the promise management system. Although values, or calculations, are provided for the Minimum Promise Amount, preferably these calculations are modifiable by the systems administrator.

FIG. 6 is a flowchart 54 of the functions executed for each account by the promise option advisory module. In FIG. 6, reference is made to values (1) through (16), corresponding to the promise options shown in FIGS. 5A and 5B. Not all of the promise options (1) through (16) are applicable to each user, and which of the promise options (1) through (16) are calculated depends upon which of the promise types 48-1 through 48-4 are selected, as shown in FIGS. 3A through 3D.

As shown in FIG. 6, in operation S20, the promise option advisory module receives values and parameters (2), (3), (5), and (6), shown in FIGS. 5A and 5B, organized by groups and queues, from the collection system or database. Then, in operation S22, the promise option advisory module calculates additional values (1) and (4), and the decision engine calculates additional values (7)-(16), depending upon which are applicable, in accordance with FIGS. 5A and 5B. The promise option advisory module then organizes and displays values and parameters (1)(16) to the user, in operation S24.

The user then negotiates with the account holder, based upon the values and parameters (1)-(16), shown in FIGS. 5A and 5B, and displayed to the user.

The user may override some of the suggested values, most notably the minimum promise amount (1), the maximum promise date (4), the Recommended Promise Amount 1 (7), the Recommended Promise Date 1 (8), the Recommended Promise 2 Amount (9), the Recommended Promise 2 Date (10), the Recommended Long Term Promise Amount (11), the Recommended Long Term Promise Frequency (12), the Recommended Long Term Day (13), the Recommended Deferred Payment Arrangement Amount (14), the Recommended DPA Frequency (15), and the Recommended DPA Number of payments (16) by inputting values other than the recommended payment option values into the group box 50. The user may also change details about the action input in group box 42, such as the party contacted, the place of contact, the queue to which the account should be routed for approval before submission to the collection system, etc.

Whether the recommended payment option values or other values are input into the group box 50, in operation S26, the promise option advisory module routes input values entered by the user in group boxes 42 and 50 on the promise management action dialog 40 as indicated by the value entered in field 42-3.

In operation S28, the account is then returned to the collection system, or is transmitted to a decision engine, for verification, to determine whether the promise details (minimum promise amount and the maximum promise date) meet the requirements of the collection guidelines stored in the collection system 20 or the decision engine.

FIG. 7 is a flowchart 56 of a collection cycle, including a payment promise, in which the promise management system is used. In the flowchart 56 of FIG. 7, operations S30, S32, S34, S36, S38, S40, and S42 correspond, respectively, to operations S10, S12, S14, S16, and S18 of the collection cycle of the prior art, shown in FIG. 1, the explanation of which is not repeated herein. The collection system 20 shown in FIG. 7 is the same as the prior art collection system shown in FIG. 1.

However, in the flowchart 56 of FIG. 7, operations S34 and S36 are added using the promise management system. In operation S34, the promise option advisory module, included in the promise management system, calculates and presents to the user using the promise management action dialog 40 described herein above, promise options (1)-(16) in accordance with FIGS. 3A through 3D and FIGS. 5A and 5B herein above. Then, in operation S36, the account is presented to the user (such as the collector) with payment options, by the promise management system. Therefore, before the collector negotiates with the account holder, the collector is proactively provided with promise options, particularly with calculated promise options (1) and (4) generated by the promise option advisory module and calculated promise options (7)-(16) generated by the decision engine coupled to the promise option advisory 5 module and input thereto, that are within the collection policy guidelines of the collection system. Therefore, the promise options (1), (4), and (7)-(16) are verified by the collection system if submitted to the collection system for such verification in operation S42.

Figures 8A, 8B:
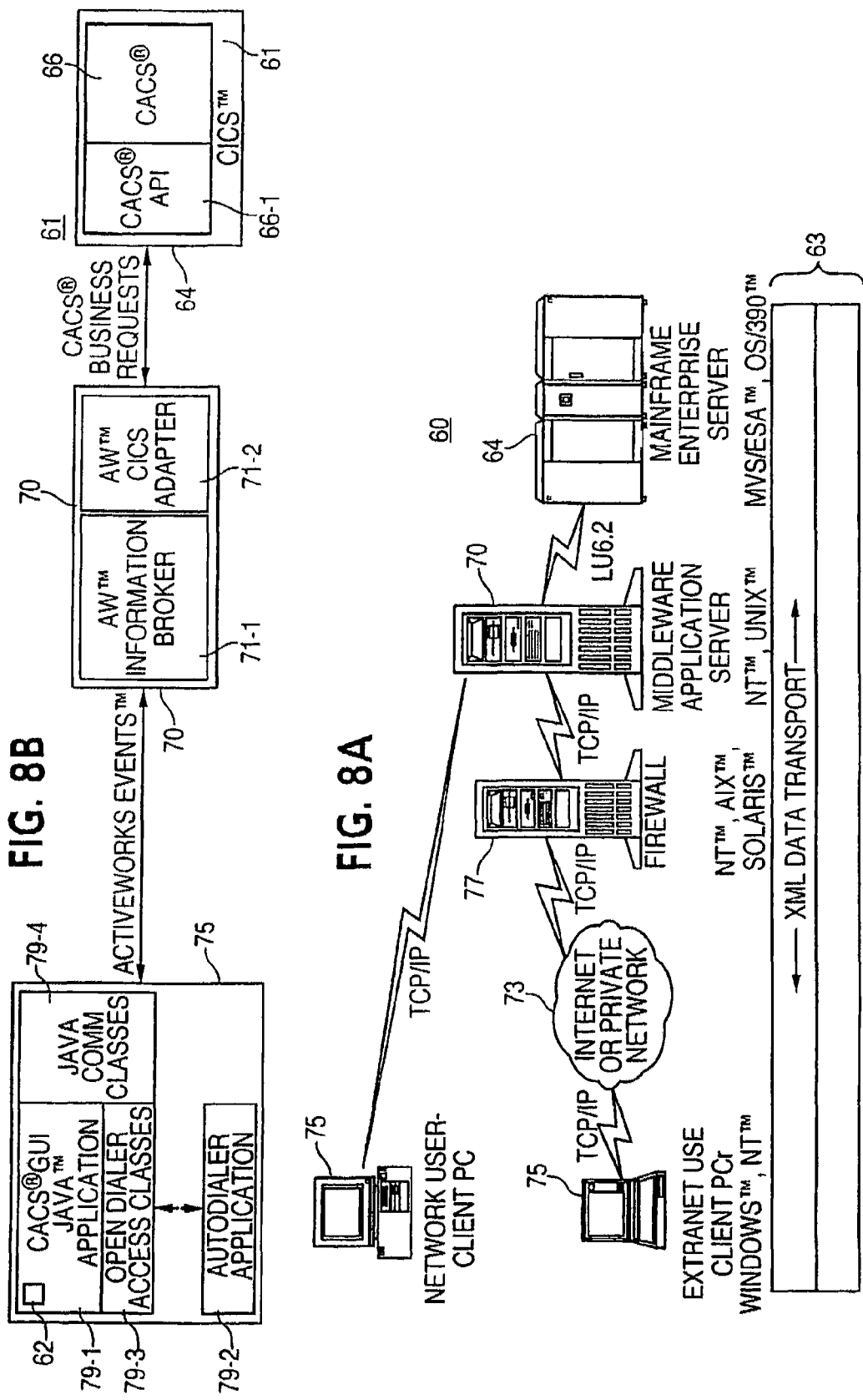
FIG. 8A is a hardware diagram of a computer system 60 on which the promise option advisory module in the promise management system is executed.
FIG. 8B is a software diagram of computer system software 61 including the promise option advisory module 62 in the promise management system.

FIGS. 8A and 8B are explained in conjunction with each other, and show examples of a computer system 60 (FIG. 8A) and computer system software 61 (FIG. 8B) in which the promise option advisory module is included. It will be apparent to one of ordinary skill in the art that the computer system and computer system software shown in FIGS. 8A and 8B, respectively, are examples of systems in which embodiments can be included, and embodiments can be included in various other systems, having differing architectures, not shown in FIGS. 8A and 8B.

FIG. 8A is a hardware diagram of a computer system 60 on which the promise option advisory module 20 included in the promise management system is executed.

FIG. 8B is a software diagram of computer system software 61 including the promise option advisory module 62 in the promise management system.

As shown in FIG. 8A, data is passed between all of the components of the computer system 60 using, preferably, XML data transport 63.

Referring now to FIGS. 8A and 8B, a mainframe computer 64 running CICS™ 61 executes a collection system such as CACS® Enterprise 66, which interfaces to a database (not separately shown in FIGS. 8A and 8B) included in the mainframe computer 64. The database stores, for example, the account data entered or approved by the collector on the promise management action dialog 40. The mainframe computer 64 is preferably a Mainframe Enterprise Server, executing MVS/ESA™ or OS/390™. CICS™, MVS/ESA™, and OS/390™ are well-known in the art.

When a collector requests an account, the collection system, such as CACS® Enterprise 66, accesses the database, and passes through a CACS® API (application program interface) 66-1 as a CACS® Business Request the data read therefrom to a middleware server 70 in an XML data stream, using an LU 6.2 interface. The middleware server 70, which is typically executing UNIX™ or NT™, manages the communication session between the client PCs 75 and the mainframe 64, using infrastructure software components, such as Active Works™ CICS™ Adapter 71-2 and Active Works Information Broker™ 71-1, then passes the formatted data as ActiveWorks Events™ over a TCP/IP connection, either to a network user on a client PC 75 or to an extranet user on a client PC 75 executing WINDOWS™ or NT™. WINDOWS™, NT™, and TCP/IP are well-known in the art.

If the formatted data is passed to the extranet user, the path is through firewall 77, over another TCP/IP connection to the internet or a private network 73, and over an additional TCP/IP connection to the PC 75. Firewall 77 is preferably executing NT™, AI™, or Solaris™. AIX™, NT™, and Solaris™ are well-known in the art.

When the formatted data reaches the client PC 75, then the formatted data is presented to the promise option advisory module 62 as part of the promise management system executed by the PC 75 as a CACS® GUI Java™ Application 79-1. Interfaces between the CACS® GUI Java™ Application 79-1 and the middleware application server 70 include Java™ Communication classes module 79-4, Open Dialer Access Classes™ 79-3, and Autodialer Application™ module 79-2, all executed by the PC 75 and all well-known in the art.

The promise management system 62, which preferably is software being executed by a client PC 75 executing WINDOWS™ or NT™, displays the formatted data to the user using the promise management action dialog 40 discussed herein above, in accordance with the flowchart 54 shown in FIG. 6. The client PC stores the promise management system, including the promise option advisory module 62, on a storage medium included therein, such as hard disk drive.

Figure 9:
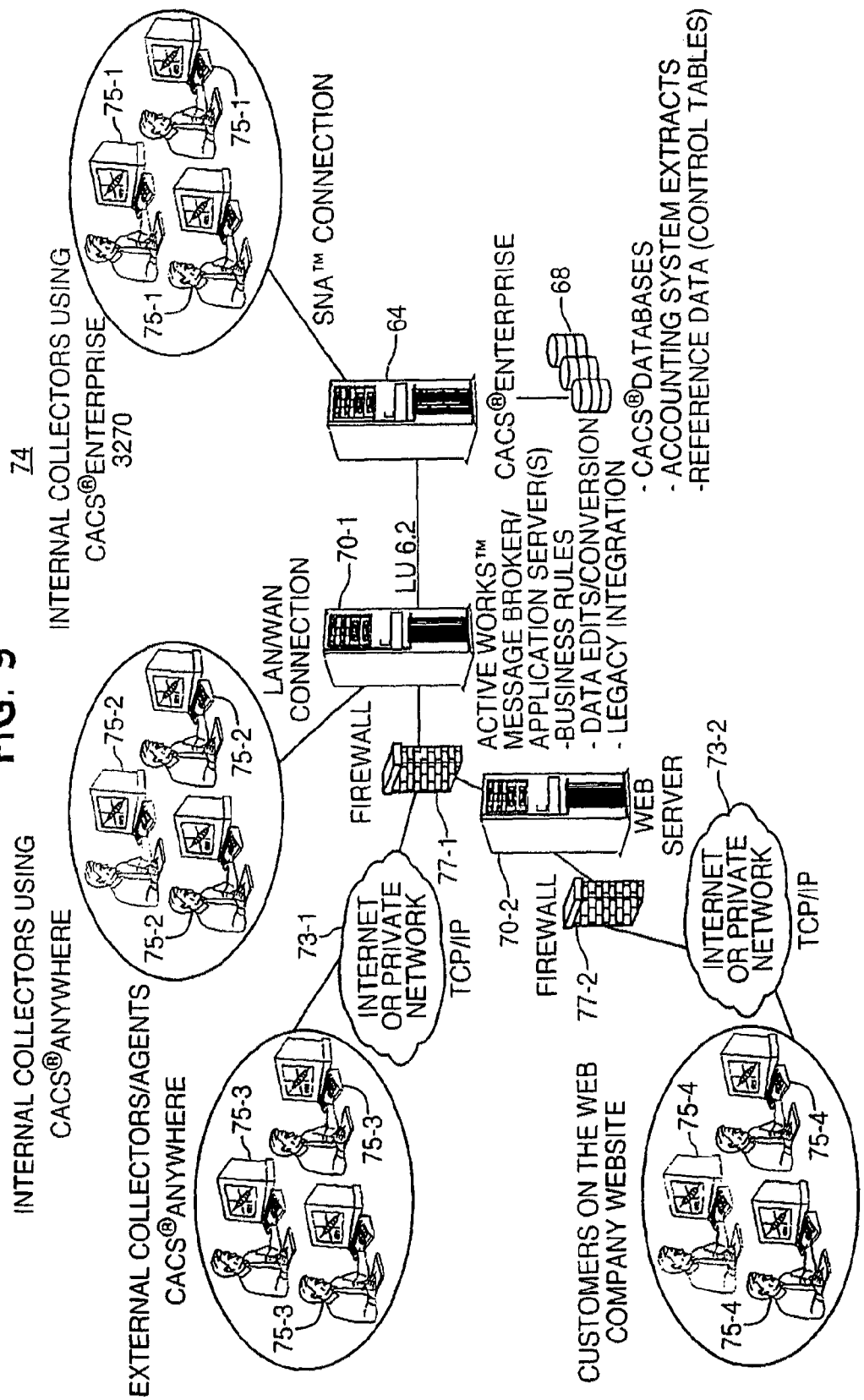
FIG. 9 is a hardware architecture diagram of a network 74 including client personal computers 75 executing promise option advisory module software 62.

FIG. 9 is a hardware architecture diagram of a network 74 including client personal computers 75 executing promise option advisory module software 62. The configuration of the network 74 shown in FIG. 9 is customizable from client to client, and the particular configuration shown in FIG. 9 is not required for successful operation of the promise option advisory module.

As shown in FIG. 9, a collection system 66 is executed by a mainframe computer 64, including a database 68 storing data extracted from an account and reference data such as control tables. The mainframe computer 64 is coupled to a middleware server 70-1, including a message broker/application server. The message broker/application server 70-1 passes the data, but may store business rules, data edits and conversions, and legacy integration information. The message broker/application server is coupled to a Firewall 77-1, to PCs 75 through a local area network (LAN) or wide area network (WAN) connection, and to PCs 75 through System Network Architecture™ (SNA™) connections.

The users of the PCs 75-1 coupled to the computer 64 through the SNA™ connection are internal collectors using CACS® Enterprise 3270. The users of the PCs 75-2 coupled to the middleware server 70-1 through the LAN/WAN connection are internal collectors using application software in which the promise option advisory module 62 is included, referred to as CACS® Anywhere.

Through a Firewall 77-1, the middleware server 70-1 is coupled over a TCP/IP connection through the internet or a private network 73-1 to PCs 75-3 used by External Collectors/Agents using application software in which the promise option advisory module 62 is included (CACS® Anywhere).

Also through Firewall 77-1, the middleware server 70-1 is coupled to web server 70-2. Then, over TCP/IP connection through Firewall 77-2 and the Internet or a private network 73-2, the web server 70-2 is coupled to PCs 75-4 used by customers accessing a companys' website on the worldwide web.

The mainframe computers 64, the middleware servers 70, and the network 73 are known in the art.

FIG. 10 is a data flow diagram showing data flow in a preferred architecture of a computer system 76 implementing the promise option advisory module 62. FIG. 11 is a flowchart 82, related to, and explaining, the data flow diagram of FIG. 10.

FIGS. 10 and 11 are explained jointly in the following paragraphs, and in the following explanations of FIGS. 10 and 11, encircled numerals indicate data explained in FIG. 11 being passed between the promise option advisory module 62, Decision Engine 78, the database 68, the collection system 66, and the company web site 80, in the direction(s) shown in FIG. 10.

Promise option advisory module access is established through a user interface 80, preferably a GUI interface. The promise option advisory module 62, the decision engine 78, and the database 68 are referred to as utility components of the promise management system. The collection system 66 interfaces to the promise option advisory module 62 by a mainframe access, by internet access through a company website, or through a LAN (local area network) internal access.

As shown in FIG. 10, the promise option advisory module 62 is a standalone utility function, and is software executed by, for example, a personal computer. Data is passed between the promise option advisory module 62 and the decision engine 78, the user interface 80, the collection system 66, and the database 68 using, for example, a well-defined application program interface (API).

As shown in FIGS. 10 and 11, a user in operation S50 through a user interface 80 requests promise options from the promise option advisory module 62. Next, in operation S52, the promise option advisory module 62 accesses account data and promise options (for example, promise options (2), (3), (5) and (6) shown in FIGS. 5A and 5B) stored, preferably, in the database 68 included in a database server (not shown in FIG. 10) or in collection system 66. The database 68 is populated with the account data and the promise options downloaded from the collection system 66 to the database 68. Optionally, database 68 could be part of an additional computer system.

The account data and promise options, which are predetermined by the collection system 66, are returned to the promise option advisory module 62, as shown in operation S54. In operation S56, the promise option advisory module requests the decision engine 78 (explained in further detail herein below) calculate promise options (particularly promise options (7)-(16) shown in FIGS. 5A and 5B, but also promise options (1) and (4) shown in FIGS. 5A and 5B, if needed). Otherwise, the promise option advisory module 62 calculates the promise options (1) and (4), and the decision engine calculates promise options (7)(16) in accordance with the above-mentioned description.

If the promise option advisory module 62 requests that the decision engine 78 calculate the promise options in operation S56, the decision engine 78 returns the calculated promise options to the promise option advisory module 62, in operation S58. If the promise option advisory module 62 does not request that the decision engine 78 calculate the promise options in operation S56, then the promise option advisory module 62 calculates the promise options in accordance with the above-mentioned FIGS. 5A and 5B, and control proceeds directly to operation S60.

In operation S60, the calculated promise options are returned to the user for presentment and selection. Next, in operation S62, the promise option or other arrangements agreed to by the user are transmitted to the promise option advisory module 62. The promise option advisory module then determines whether the decision engine 78 should be called to validate or approve the promise agreed upon. If the promise option advisory module 62 determines that the decision engine 78 should not be called, such as in the case that the calculated promise options are selected by the user, then control passes to operation S72, which is explained herein below.

On the other hand, if the promise option advisory module 62 determines that the decision engine 78 should be called, then the promise option/data is passed to the decision engine 78 for acceptability and tolerance checking, in operation S66.

In operation S68, the validation results are returned to the promise option advisory module 62. If the validation results contain errors, the errors are returned to the user in operation S70.

If the validation results do not contain errors in operation S68, or, if in operation S64 the promise option advisory module 62 does not send the promise option or arrangement to the decision engine for validation, then, in operation S72, an accepted message is sent to the user via the user interface 80, the customer's account is updated, preferably, in the database 68 or in the collection system 66, and the promise data is recorded for strategy evaluation and tuning in database 68. The customer's account data is transmitted between the collection system 66 and the database 68, as shown in FIG. 10, to reconcile the data stored in the collection system 66 and the database 68.

The operation of the system 76 shown in FIG. 10 varies slightly from the previous description of a system implementing the promise option advisory module 62. In the system 76 shown in FIG. 10, the decision engine 78 validates the promise options before the promise options are sent to the collection system 66. Validation of the promise options by the decision engine 78 ensures that the promise options transmitted to the collection system 66 will be accepted by the collection system 66, thus reducing even further the amount of time required to record a valid promise in the collection system 66.

The decision engine 78 is now briefly explained. Decision engines, generally, are well-known in the art. The decision engine 78 implements a rules based decision management system, which is a computer implemented system applying strategies to determine actions to be taken, monitoring performance based on the taken actions, and providing a manner to refine the strategies in accordance with the monitored performance. An example of a decision engine 78 is discussed in the above-mentioned DECISION MANAGEMENT SYSTEM WHICH IS CROSS-FUNCTION, CROSS-INDUSTRY AND CROSS-PLATFORM. For example, the AMS Strata® decision support system is a software based system which applies predictive modeling techniques to customer data, to thereby generate dramatic improvements in the effectiveness and profitability of customer interactions, as discussed in the above-mentioned DECISION MANAGEMENT SYSTEM FOR 5 CREATING STRATEGIES TO CONTROL MOVEMENT OF CLIENTS ACROSS CATEGORIES. The AMS Strata® decision support system release 2.0 was released in 1993, and release 3 is currently available.

The promise option advisory module 62 can also be used, in conjunction with the decision engine 78, the database 68, and the collection system 66, to determine test and control groups strategy, to provide examples of acceptable promise options which are not necessarily in accordance with the promise options as defined in the above-mentioned FIGS. 5A and 5B. The decision engine 78, for example, could also be used to provide effectiveness reporting of promise options, by providing acceptance results in finer gradations of categories, by stratifying the acceptance results across measures of customer segments and test groups, instead of at the enterprise level as is the current state of the art.

A case based promises embodiment is discussed in connection with FIGS. 12A-12D, FIGS. 13A-13E, and FIGS. 14-17. A case based promises embodiment results in a shift from a collections business model using account based processing where each "account" stands on its own and is evaluated and processed separately, to a system where all of the customer's accounts are dealt with as a "case". The accounts in a case are organized as a "customer hierarchy" which illustrates a hierarchy relationship between the accounts for the case, as discussed in more detail below. Processing at the case level (that is, a top level in the customer hierarchy) allows the credit grantor to determine actions and collections treatment in the context of the customer and their multiple accounts. Customer, in this context, refers to an individual, an entity (such as a business), or a combination of one or more individuals and/or entities. For example, a customer might be a household which is a group of individuals living at the same address, or a business which is specified individuals plus the ultimately responsible business (useful for cellular telephone or business charge accounts), or a partnership, and the like, or variations thereof.

The embodiment can include calculating, displaying and taking a commitment to pay an amount that is owed an organization based upon the organizational relationship defined as a case. The organizational relationship defined as a case consists of accounts that are logically grouped together to form a single case. The case based promise embodiment can calculate the amount for a case based promise and can disperse the case based promise across the accounts allowing a system user to initiate a promise using a single click of the mouse. A user interface displays a summary of the customers and/or accounts that make up the case and provides the implementation for a system user to take the case based promise.

A case based promises embodiment can provide a summary of an action now amount, where the "action now amount" is defined as the optimal amount(s) that the collector needs to get a commitment to pay from the customer. The action now amount can be, for example, a recommended promise amount from the decision engine (discussed above). The data displayed to the collector is the result of configurable rules using the account data, with roll-ups to the higher levels of amounts in the customer hierarchy. The collector can select, e.g., a hyperlinked amount to cause the recording of the promise at multiple levels in the customer hierarchy.

FIGS. 12A-12D relate to a representative hypothetical customer, Bob Smith, and FIGS. 13A-13E relate to a different representative hypothetical customer, Charles Smith. The account level information used for each respective customer is consistent, with a case for customer Charles Smith having a more complex customer hierarchy than a case for customer Bob Smith.

Figure 12A:
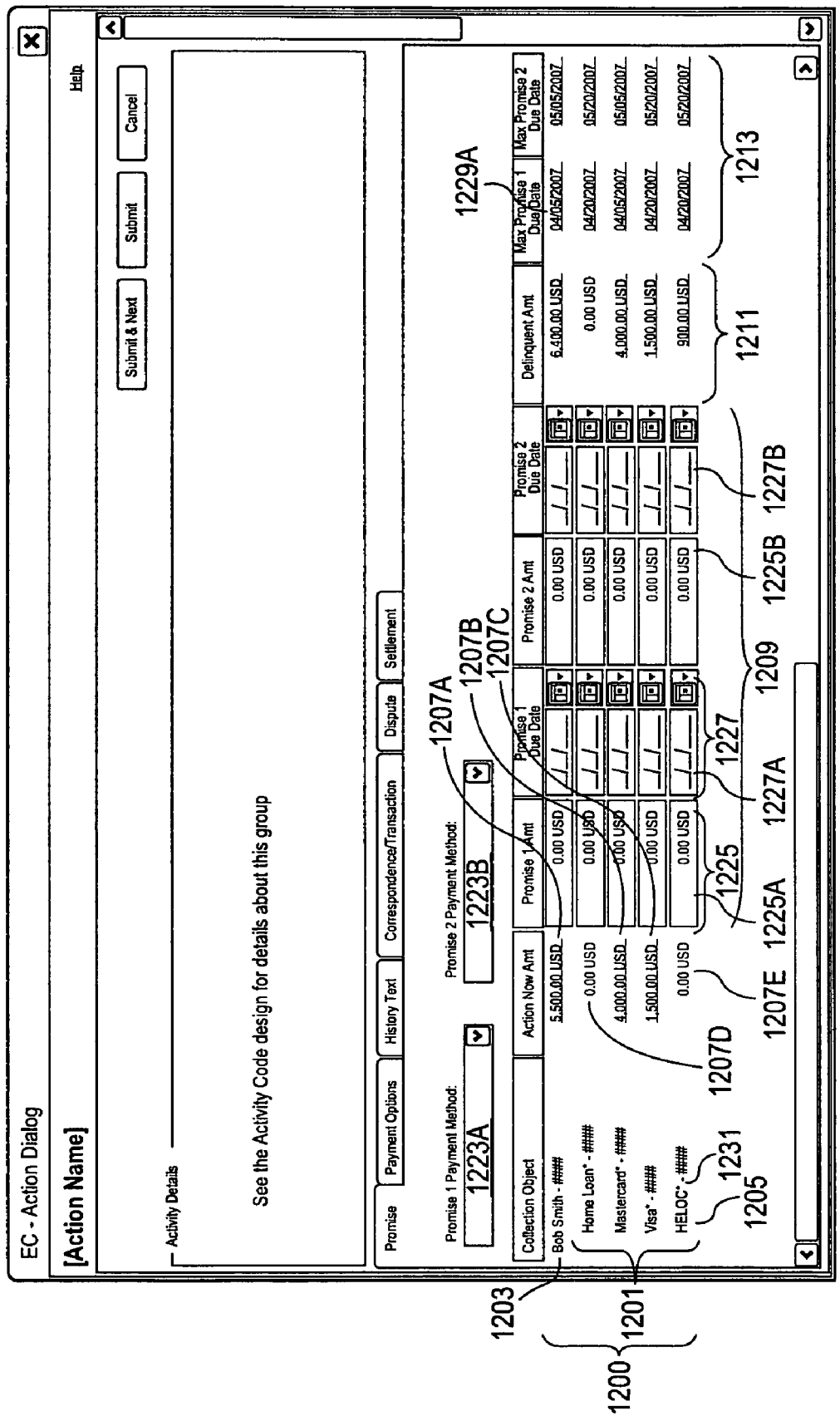

Referring now to FIGS. 12A-12D, illustrations of portions of an exemplary user interface will be discussed and described. In overview, FIG. 12A illustrates an initial page for case based promises, FIG. 12B is a continuation of the initial page illustrated in FIG. 12A, FIG. 12C is a different page in which a collector chooses to collect an entire action now amount, and FIG. 12D is another page in which the collector chooses to collect an action now amount for a lower level in the customer hierarchy. Each figure is further explained below.

FIG. 12A and FIG. 12B together illustrate an initial page for case based promises, with the user scrolling right from FIG. 12A to FIG. 12B. FIGS. 12A-12B illustrate an account level 1201 including plural accounts 1205, a customer level 1203. A customer hierarchy 1200 includes one or more accounts 1205 in one or more account levels 1201 and a customer 1203. A customer hierarchy 1200 providing a display of a case can further include group levels and sub-group levels (not shown) in between the customer and account levels.

Also illustrated is a promise advisor portion 1209 showing promise amounts (e.g., 1225a, 1225b), promise due dates (e.g., 1227a, 1227b), and maximum promise due dates 1213 for each account level 1201.

The action now amounts 1207a-e are optimal amounts for a customer to pay. The action now amounts can be determined using rules. In this example, the rule for determining the action now amounts for account levels calculates 100% of the delinquent amount for the account level. Other rules, however, can be used to determine an optimal action now amount. Such rules can consider account financial attributes, system attributes, and various scoring methods, as discussed above. For example, the action now amounts can be defined as the "recommended promise amount" discussed above, and can be calculated in the same fashion as the recommended promise amounts.

Also illustrated are action now amounts 1207a-1207e for each level (e.g., customer level 1203, account levels 1205, and any intervening levels (discussed and illustrated below)). An action now amount for an account level can be determined if there is no promise amount (that is, a zero value) in the promise advisor 1209. For example, if the promise amount=0, then the action now amount can be set to the delinquent amount plus the overlimit amount. The illustrated user interface can display conventional information for any or all levels of the customer hierarchy, for example a delinquent amount 1211, an over-limit amount 1215, a balance amount 1217, and a current due amount 1219.

The action now amounts 1207b, 1207c, 1207d, 1207e for account levels in the customer hierarchy 1200 are added to obtain the action now amount 1207a for the next higher level in the customer hierarchy 1200, in a recursive manner up to the customer level 1203. The closest maximum promise due date 1213 for account levels is used to obtain the maximum promise due date 1229a for the next higher level in the customer hierarchy 1200, in a recursive manner up to the customer level 1203. In the illustrated example, the maximum promise due dates for the account levels just below the case levels for promise 1 are Apr. 20, 2007 and Apr. 5, 2007, and for promise 2 are May 20, 2007 and May 5, 2007. Assuming that the current day is earlier than any of those days, the closest maximum promise due date is Apr. 5, 2007 because that date is the next to occur of the maximum promise due dates for account levels below the next higher level (in this example, the case level). As illustrated, the Apr. 5, 2007 date is used as the maximum promise due date for promise 1 1229a for the next higher level, that is, the case level. This maximum promise date 1229a would also be used in connection with the action now amounts that are selected.

One or more of the promise amount fields 1225 and/or the promise due date 1227 fields can be manually entered by a user, if desired. Optionally, one or more of the promise amount 1225 fields can be filled in using the links from the columns for action now amount 1207a-e, delinquent amount 1211, minimum promise amount 1213, or current due amount 1219. Optionally, one or more of the promise due date 1227 fields can be filled in using the links for the columns maximum promise 1 due date or maximum promise 2 due date 1213.

The payment methods 1223a, 1223b can define a means of providing payment for a specific promise, such as a check payment at a branch, a check payment via mail, a credit card payment by telephone, and the like.

FIG. 12C is a page in which a collector chooses to collect an entire action now amount, to be dispersed to lower levels in the customer hierarchy. For example, the collector can click on the customer action now amount 1207a and a maximum promise 1 due date 1229a for the customer level. The system then disperses the action now amount to lower levels by pre-filling the date fields and the promise amount fields with partitioned amounts of the action now amount for all levels below the level of the selected action now amount.

In this illustration, the selected action now amount is at the customer level 1207a. The promise amount fields 1225b, 1225c and promise due date 1227b, 1227c fields for the lower levels are then filled in, where the account level action now amount is non-zero.

Here, the selected action now amount for the customer is $5,500, with a maximum promise due date of Apr. 5, 2007. The promise amounts of $4,000 and $1,500, corresponding to the partitioned amounts of the action now amounts for the account levels, are pre-filled into the promise amount fields 1225b, 1225c and the maximum promise due date of Apr. 5, 2007 is pre-filled into the promise due date fields 1227b, 1227c.

More particularly, the action now amount which is selected is dispersed down to its lower levels in the customer hierarchy, according to the action now amounts which were previously determined at the lower levels. The dispersing downward of the action now amount is recursive, through intervening levels (if any, as shown in FIGS. 13A-13E) to the lowest levels. Also, the closest maximum promise due date 1229a is copied to the promise due date fields 1227b, 1227c for account levels which have action now amounts. Note that a collector can manually set a promise due date, for example, by clicking on the promise due date 1227b, 1227c and entering the desired date.

FIG. 12D is another page for a scenario in which the collector chooses to collect an action now amount for an account level in the customer hierarchy. Here, the collector clicks on the "Mastercard" action now amount 1207b of $4,000, and clicks on the maximum promise due date 1229a of the account level for the Mastercard. For the account level, the system pre-fills the promise amount 1225b and the promise due date 1227b, only for the account level, from the action now amount 1207b and the maximum promise due date 1229a, respectively. The collector can manually edit the other fields, if desired, by entering a promise amount 1225b and promise due date 1227b.

Figure 13A:
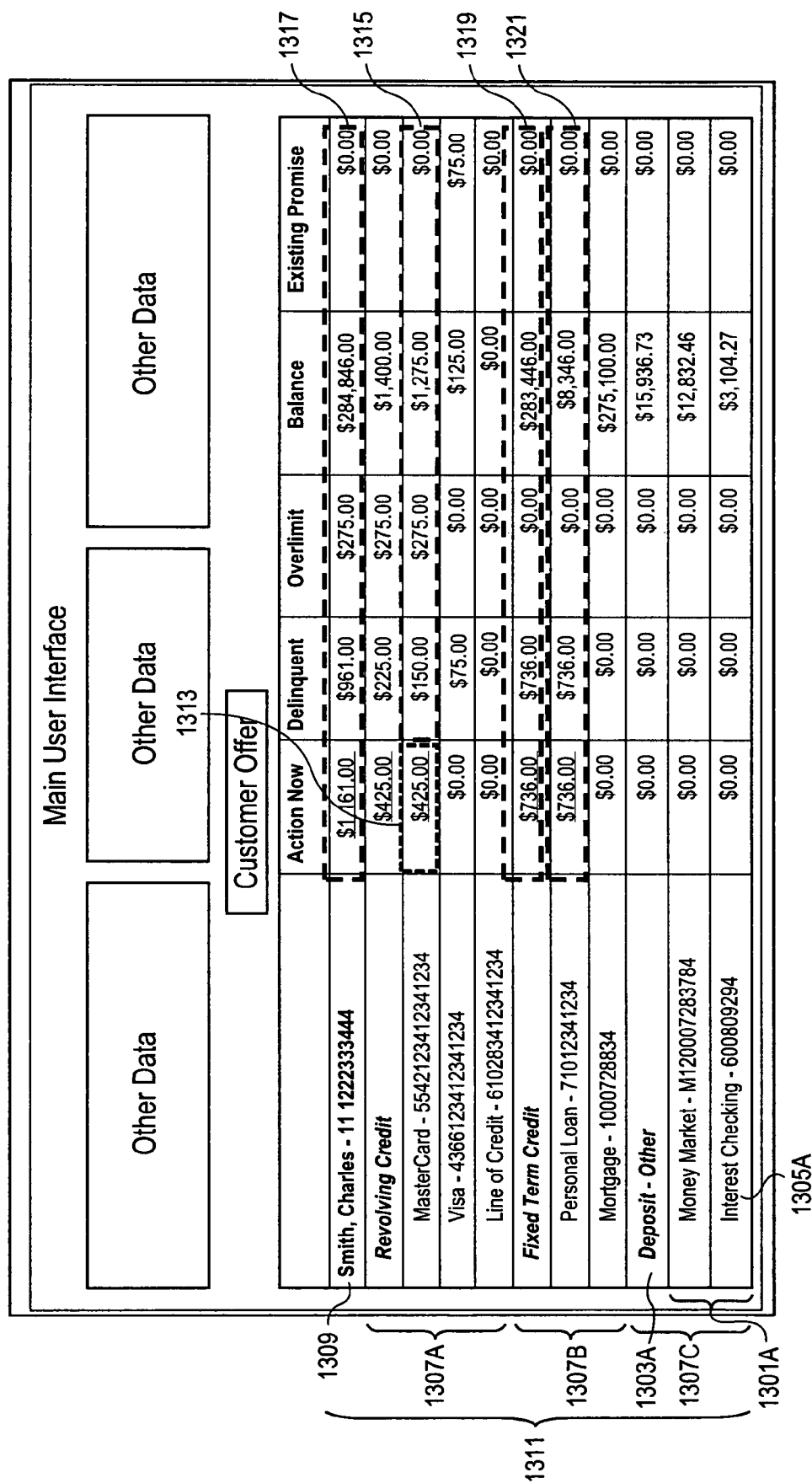
Figure 13E:
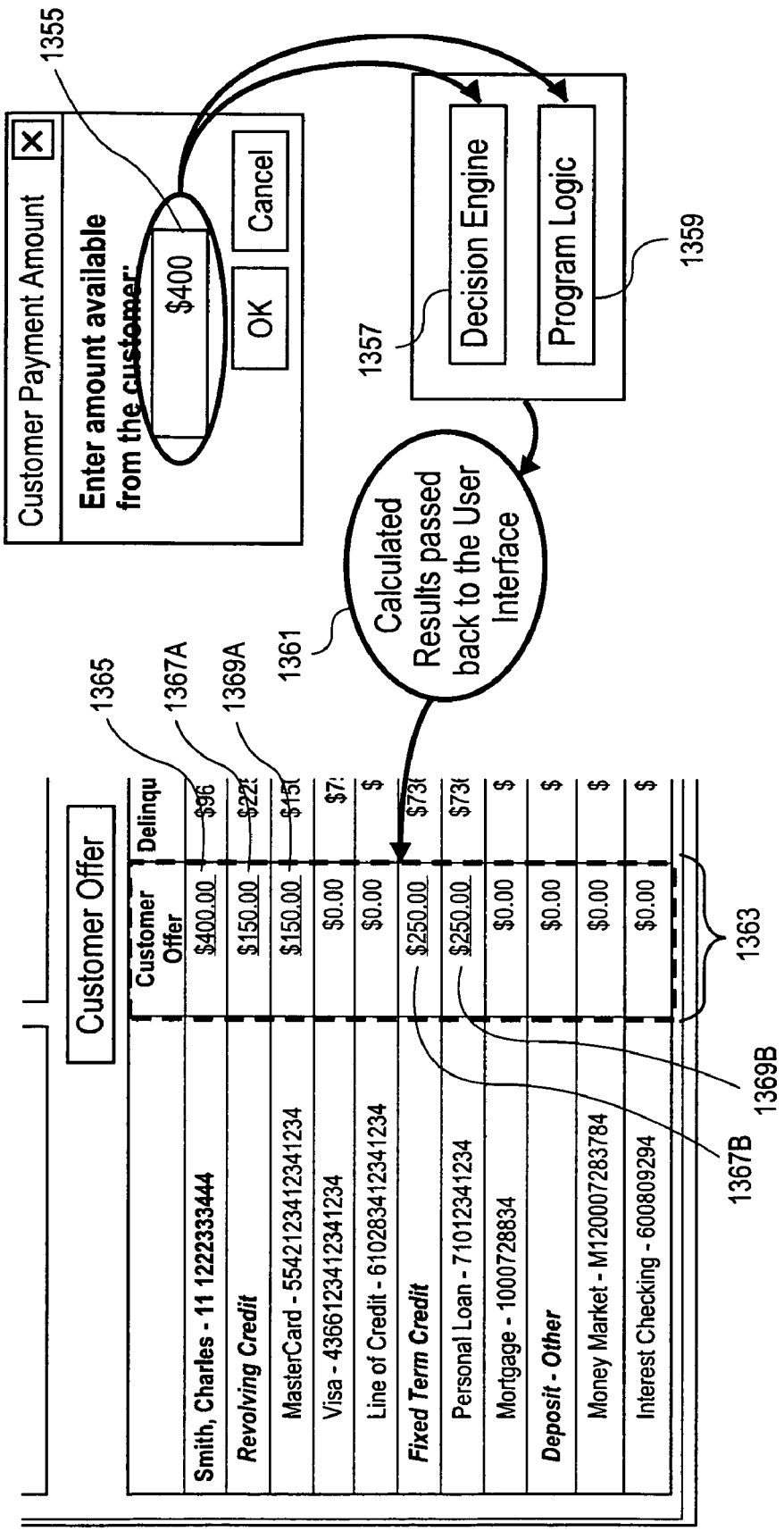

Referring now to FIGS. 13A-13E, illustrations of portions of another exemplary user interface will be discussed and described. In overview, FIG. 13A illustrates a page with a more complex customer hierarchy for hypothetical customer Charles Smith, FIG. 13B illustrates a page with action now amounts for an account level rolling up to a group level, FIG. 13C illustrates a page rolling-up group levels up to a customer level, FIG. 13D illustrates a customer offer interface, and FIG. 13E illustrates a flow distributing the customer offer among lower levels in the customer hierarchy. Each figure is further explained below.

FIG. 13A illustrates a page with a more complex customer hierarchy for hypothetical customer Charles Smith. A customer hierarchy 1311 includes a customer 1309 and one or more intervening levels 1307a, 1307b, 1307c. Each of the intervening levels includes plural account levels 1301a (each with an account e.g., 1305a) and an intervening level object 1303a. The intervening level object 1303a describes the grouping of account types, e.g., "revolving credit," "fixed term credit", "deposit-other". The information for the lowest levels, i.e., the account information, is rolled up to the intervening level (here, a group level), and ultimately to the customer level, sometimes referred to as the "case level." This illustration shows group levels, but there can be multiple levels of group levels intervening between the account level and the case level, such as group levels and sub-group levels.

Also illustrated is a case level financial roll-up 1317, an account type financial roll-up 1319, an account level financial data 1321. The account type or group level financial roll-up 1319 is a sum of the account level financial data 1321 in the levels hierarchically below it. The case level financial roll up 1317 is a sum of the account type financial roll-ups which are hierarchically below it.

In this example, action now amounts include an account level action now amount 1313 are presented for the collector to see and use in negotiations, and can be selected to record a promise for example via a hyperlink. Account level data 1315 can be evaluated with configurable rules applied to determine an optimal amount that the collector should negotiate with the customer for a promise to pay arrangement. Although this illustration uses a simple calculation, the configurable rule can include a more complex calculation.

In this example, the collector operating the user interface would only need to click the mouse on the "$1,161" hyperlinked field and it would record promises for all the accounts (lowest level) below it. Alternatively, if the customer only wanted to pay the Fixed Term Credit account, the collector can click the mouse on the $736 amount and it will record promises for all the account level objects below that (Personal Loan and Mortgage).

This user interface offers a quick way to get to the crux of what the collector needs to get commitment from the customer in an easy to action format that is driven by parameters to determine the desired amount, and a facilitated way so that work can be done quickly.

Incidentally, the illustrated main user interface shows data in a condensed format for ease of the present discussion.

FIG. 13B illustrates a page with action now amounts for an account level rolling up to a group level. Here, there are two non-zero action now amounts 1333, 1335 for account levels 1305*b*, 1305*c*, which are hierarchically below an intervening level 1303*b*. The account level action now amounts 1333, 1335 are totaled to provide an intervening level action now amount 1331.

FIG. 13C illustrates a page rolling-up group levels up to a customer level. The illustration shows three action now amounts 1343, 1345, 1347 for intervening levels 1303*a*, 1303*b*, 1303*c*, which are hierarchically below a case level 1309. The intervening level action now amounts 1343, 1345, 1347 are totaled to provide a case level action now amount 1341.

FIG. 13D illustrates a customer offer interface. In the event that a customer cannot pay the recommended "action now" amount, an alternative is to allow the customer to indicate the amount they can pay, and recommend how the customer offer amount should be applied to the accounts. A customer offer process can be launched, for example using a button 1351 to present a dialog for the collector to enter an amount that the customer tells them that they can pay. Here, a customer offer entry dialog 1353 is provided and includes a customer offer payment amount 1355 so the user can manually enter an amount which the customer offers.

Continuing on, FIG. 13E illustrates a flow distributing the customer offer among lower levels in the customer hierarchy. Here, the customer offer payment amount 1355 has been submitted. In this example, note that a customer offer column 1363 is now displayed. A background process such as a decision engine 1357 (described above), program logic 1359, or combination, evaluates the data to determine an optimal application of the funds. The decision engine 1357 also uses the customer data in the customer hierarchy as input to the decision engine 1357. Calculated results 1361 are passed back to the user interface and inserted as the customer offer column 1363. The customer offer amount 1355 is entered into a customer offer field 1365, and the calculated customer offer is distributed in the customer offer column 1363 among the levels which are hierarchically below the level in the customer hierarchy. Although this example shows a customer offer at the customer level, other embodiments can provide for a customer offer to be entered at a group level.

In this illustration, the partial customer offer is $400 for the case level 1365. The customer offer of $400 submitted to the decision engine 1357 and the program logic 1359. The decision engine 1357 and the program logic 1359 determine that $150 will be applied to the MasterCard account level 1369*a*, and $250 should be applied to the personal loan account level 1369*b*. In this example, factors such as account and customer risk, security (collateral) for the loan, and potential recourse in the event of default, may be used to determine how the funds should be applied. The new account level customer offer amounts are rolled up from the account levels to the higher intervening levels (if any), such as the illustrated group levels 1367*a*, 1367*b* in the customer hierarchy.

Referring now to FIG. 14, an illustration of a flowchart of a collection cycle including case based promises to pay will be discussed and described. In the flowchart 1456 of FIG. 14, operations S1430, S1438, S1440, and S1442 correspond, respectively, to operations S10, S14, S16, and S18 of the collection cycle of the related art, shown in FIG. 1, the explanation of which is not repeated herein. FIG. 14 also corresponds generally to FIG. 7. The collection system 20 shown in FIG. 14 is the same as the related collection system shown in FIG. 1.

However, in the illustrated flowchart 1456 of FIG. 14, operations S1432, S1434, S1436 and S1442 are added using the promise management system. In operation S1432 the collector requests a case, which can include plural "accounts" discussed in connection with FIGS. 1 and 7. In operation S1434, the promise option advisory module, included in the promise management system, calculates and presents to the user using the promise management action dialog and action now dialog described herein. Then, in operation S1436, the case is presented to the user (such as the collector) with payment options, by the promise management system. Therefore, before the collector negotiates S1438 with the account holder, the collector is proactively provided with promise options and action now amounts for plural accounts in the case. In negotiating with the account holder, the collector can optionally input a customer offer S1444, and a distribution of the customer offer to levels below is determined. The promise options and customer offer can be verified by the collection system if submitted to the collection system for such verification in operation S1442.

Comparing FIG. 14 to FIG. 7, in operation S1432, the collector requests a case, whereas in operation S32, the collector requests an account. In operation S1434, the promise option advisor calculates and presents promise options and an action now amount for the accounts in the case, whereas in S34, the promise option advisor calculates and presents promise options for an account. In operation S1436, the case is presented with payment options, whereas in S36, the account is presented with payment options. In S1438, optionally, a customer offer from the customer results in operation S1444 accepting and distributing the customer offer.

Referring now to FIG. 15, a block diagram illustration portions of an exemplary computer system will be discussed and described. The computer system 1501 may include a network interface 1503 and one or more controllers 1505. The network interface 1503 can be any conventional network interface, and may be wireless or wired. The controller 1505 may include a processor 1507, a memory 1517, and other optional components which will be well understood to those in this field. A text and/or image display 1509 and a keyboard 1511 and/or other display and input device for interacting with the user, such as a track ball, console, keypad, and/or similar can also be provided with the computer system 1501.

The processor 1507 may be, for example, one or more microprocessors and/or one or more digital signal processors. The memory 1517 may be coupled to the processor 1507 and may comprise a read-only memory (ROM), a random-access memory (RAM), a read/write flash memory, a programmable ROM (PROM), and/or an electrically erasable read-only memory (EEPROM). The memory 1517 may include multiple memory locations for storing, among other things, an operating system, data and variables 1519 for programs executed by the processor 1507; computer programs for causing the processor to operate in connection with various functions such as displaying 1521 a customer hierarchy, displaying 1523 action now amounts for the customer, interacting 1525 with the user to select action now amounts, dispersing 1527 a partitioned amount of the action now amount, rolling up 1529 account level information, and copying 1531 selected promise due dates; and a database 1537 of various information used by the processor 1507. The computer programs may be stored, for example, in ROM or PROM and may direct the processor 807 in controlling the operation of the computer system 1501. Each of these computer programs is discussed by way of example below.

The processor 1507 may be programmed for displaying 1521 a customer hierarchy. That is, a user interface can be displayed with a customer hierarchy for a case. The customer hierarchy includes customer level data and data for plural account levels for multiple accounts of the customer which need collection. The customer hierarchy can include a customer level (sometimes referred to herein as a case level), one or more account levels, and one or more levels of groups intervening between the case level and account levels, as previously explained.

Further, the processor 1507 may be programmed for displaying 1523 action now amounts for the customer. The action now amounts for the customer can be displayed on the customer level and the account levels of the customer hierarchy, as well as any intervening levels of the customer hierarchy. The action now amounts for levels above the account level are calculated from the lower levels, as described above. The action now amounts for the account levels can be obtained from, for example, a decision engine 1539 as discussed herein in more detail.

The processor 1507 may be programmed for interacting 1525 with the user to select action now amounts. This has been described in detail above in connection with FIGS. 12A-D and FIGS. 13A-E.

The processor 1507 also can be programmed for dispersing 1527 a partitioned amount of the action now amount. That is, an action now amount which the customer can promise to pay is selected. A partitioned amount of the selected action now amount to be dispersed to the lower account levels is determined, and is dispersed to those levels which are below the level of the selected action now amount. (The term "below" and "above" are used herein from the perspective of the customer hierarchy, and refer to children and ancestor nodes, as distinguished from visual levels.)

Also, the processor 1507 can be programmed for rolling up 1529 account level information. For example, if a customer hierarchy includes account levels and group levels, the account level information is rolled up to higher levels in the customer hierarchy. For example, the account level information is rolled up into the intervening group level information, and the intervening group level information is rolled up into customer level information. Account level information which is a financial amount is rolled up by being added, whereas dates are rolled-up by using the nearest chronological date. The rolled-up amounts can be displayed on a user interface.

The processor 1507 can be programmed for copying 1531 selected promise due dates. As described above in more detail, if a promise due date for an intervening level or a customer level is selected, the selected promise due date can be stored as the promise due date for levels below the level of the selected promise due date, down to and including the lower account levels.

Optionally, the processor 1507 can be provided with additional functions and/or enhancements, such as inputting 1533 a customer offer. That is, a customer offer of a partial amount (that is, less than the action now amount) can be input, and can be distributed to lower levels in the customer hierarchy. Because there is a partial amount to be distributed to the lower levels, a partial distribution amount can be calculated as described herein.

The processor 1507 also can be programmed with a partial distribution calculation unit 1535. The partial distribution can be calculated as described above, optionally in connection with the decision engine 1539.

Moreover, a computer-readable medium may include instructions for execution by a computer, the instructions including a computer-implemented method for managing case based promises to pay.

Also illustrated is the database 1537 of various information used by the processor 1507. The database 1537 is provided for local storage of information. For example, the database 1537 can be used for storing some or all of the data currently being used for a current case.

The computer system 1501 can interact with the decision engine 1539, which can be remote or local, or optionally can be part of the computer system 1501. The decision engine 1539 can be used to determine an action now amount, promise options, a partitioned amount of the action now amount to be dispersed to levels which are hierarchically below the level of the selected action now amount in the customer hierarchy, and/or a partial distribution based on a customer offer amount. The decision engine 1539 can use the case data and can interact with parameters 1513 which are particular to each customer and which define general information for the customer, and/or with rules 1515 which are used for calculating apportioned amounts to obtain optimal application of the customer offer, and/or with configurable rules for the action now amount and/or promise options.

It should be understood that various embodiments are described herein in connection with logical groupings of functions. One or more embodiments may omit one or more of these logical groupings. Likewise, in one or more embodiments, functions may be grouped differently, combined, or augmented.

Figure 16:
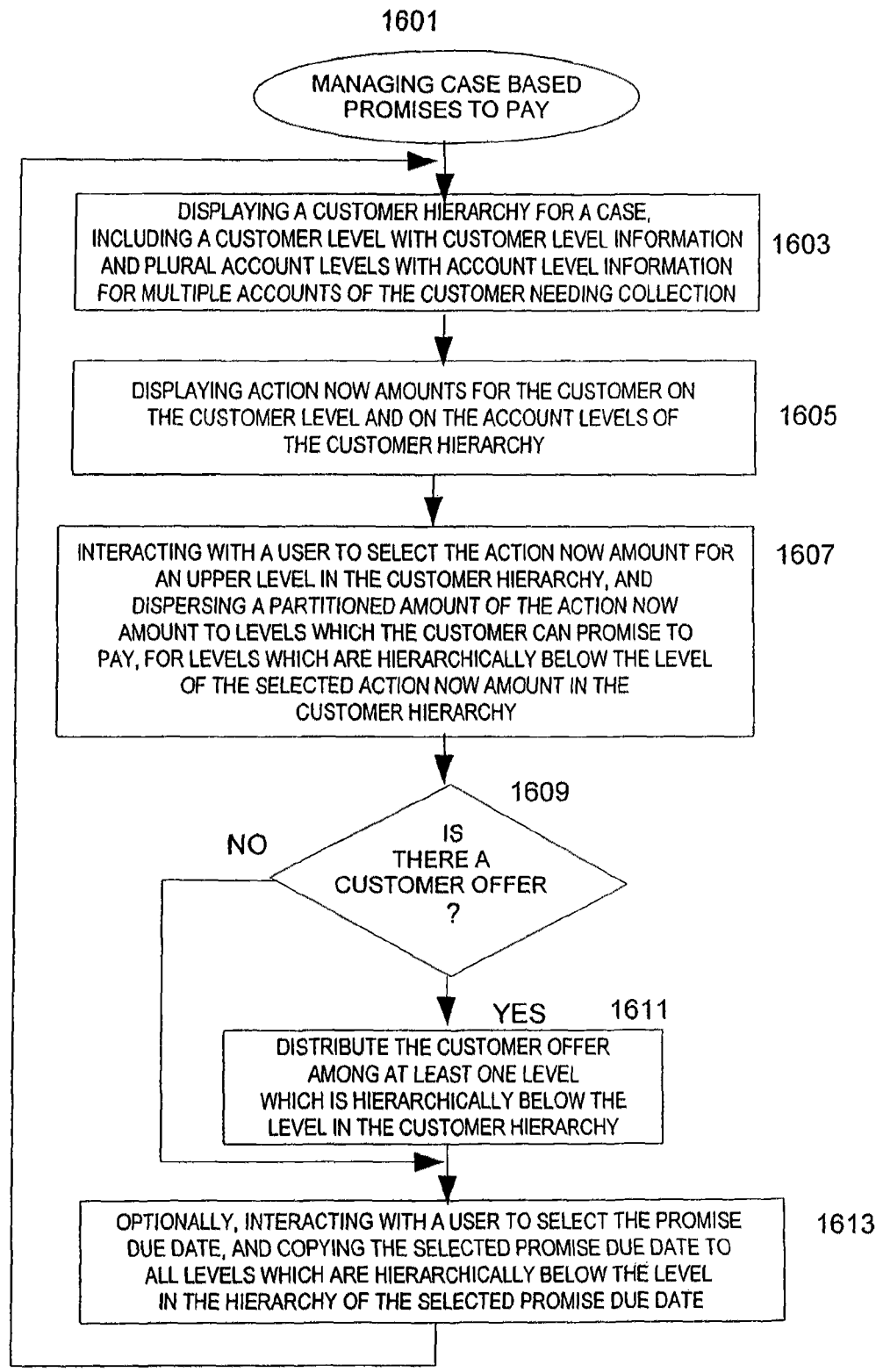

Referring now to FIG. 16, a flowchart illustrating an exemplary procedure for managing case based promises to pay will be discussed and described. The procedure can advantageously be implemented on, for example, a processor of a computer system, described in connection with FIG. 15 or other apparatus appropriately arranged.

In overview, the procedure 1601 for managing case based promises to pay includes displaying 1603 a customer hierarchy for a customer; displaying 1605 action now amounts for the customer, interacting 1607 with a user to select an action now amount for an upper level of the customer hierarchy, if 1609 there is a customer offer then distributing 1611 the customer offer, and optionally interacting 1613 with a user to select a promise due date and copying the promise due date. These are now discussed further. However, many of the functions discussed in connection with the procedure 1601 for managing case based promises to pay have been described above in detail, and such discussion will not be repeated below.

The procedure 1601 includes displaying 1603 a customer hierarchy for a case. The displayed customer hierarchy includes at least a customer level with customer level information and plural account levels with account level information. Various intervening levels between the customer level and the account levels can be included, for example a group level, a sub-group level, and so on. The accounts which are displayed at the account level include those accounts of the customer which need collection. Accordingly, the group of these accounts at the account level, all of which are related to the customer, can be referred to as a "case."

The procedure 1601 includes displaying 1605 action now amounts for the customer. The action now amounts which are displayed are at the customer level, the account levels, and any intervening group levels of the customer hierarchy. The action now amounts are determined as described herein.

The procedure 1601 includes interacting 1607 with a user to select an action now amount for an upper level of the customer hierarchy. More particular, an action now amount for one of the upper levels in the customer hierarchy can be selected, and a partitioned amount of the action now amount can be dispersed to levels which the customer can promise to pay, for those levels which are hierarchically below the level of the selection action now amount in the customer hierarchy.

The procedure 1601 includes, if 1609 there is a customer offer, then distributing 1611 the customer offer. The customer offer can be distributed among at least one level which is hierarchically below the level in the customer hierarchy.

The procedure 1601 includes optionally interacting 1613 with a user to select a promise due date and copying the promise due date. In particular, the selected promise due date is copied to all levels which are hierarchically below the level of the selected promise due date.

Figure 17:
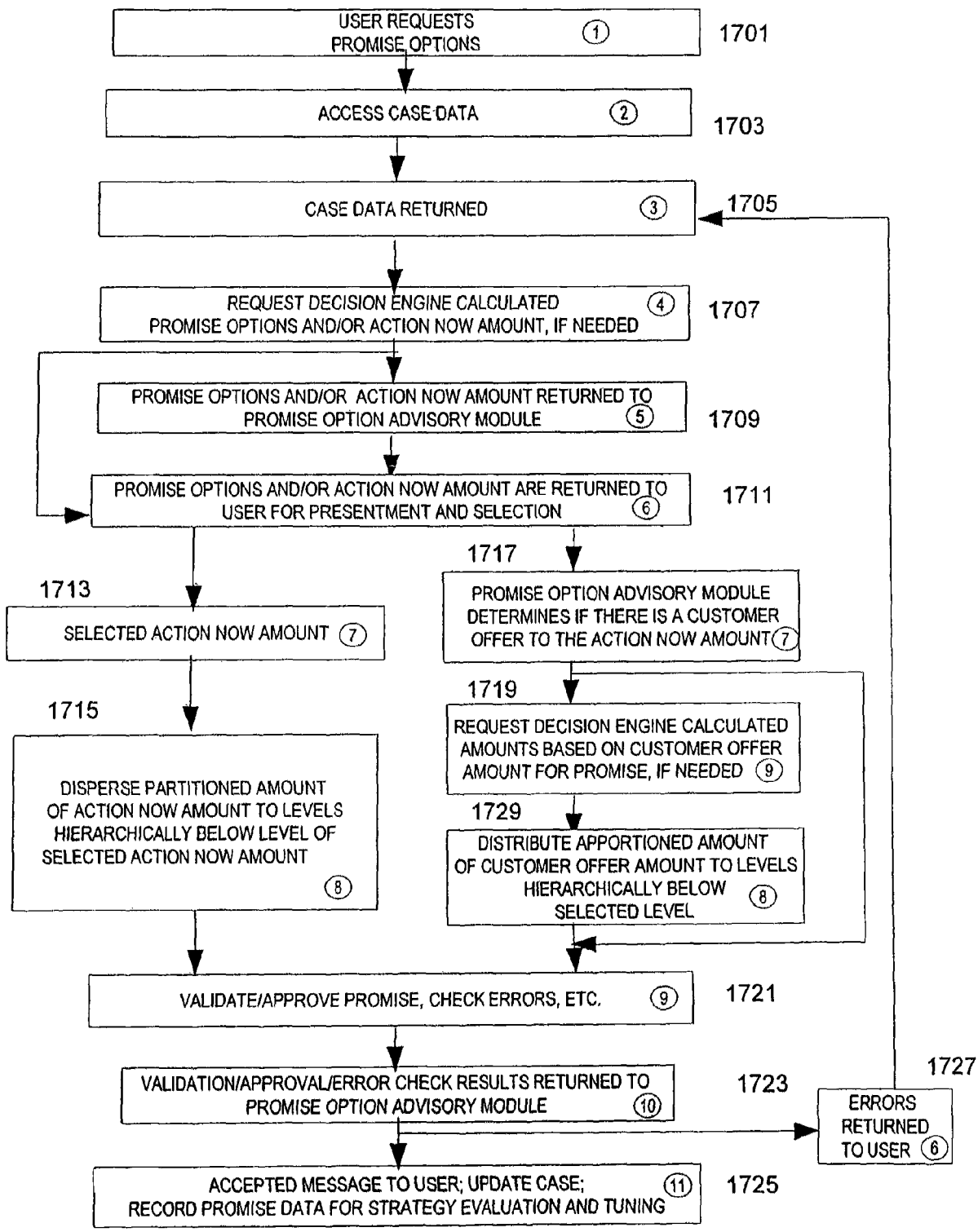
FIG. 17 is a flowchart illustrating a data flow.

Referring now to FIG. 17, a flowchart illustrating a data flow will be discussed and described. Reference is also made to FIG. 10 and 17 are explained jointly in the following paragraphs, and in the following explanations of FIGS. 10 and 17, encircled numerals indicate data explained in FIG. 17 being passed between the promise option advisory module 62, Decision Engine 78, the database 68, the collection system 66, and the company web site 80, in the direction(s) shown in FIG. 10.

Access to case-based promises in the promise option advisory module access is established through a user interface 80, preferably a GUI interface. As further described above, FIG. 10 illustrates the promise option advisory module 62, the decision engine 78, and the database 68, which are referred to as utility components of the promise management system. The collection system 66 interfaces to the promise option advisory module 62 by a mainframe access, by internet access, or through a LAN (local area network) internal access. Data is passed between the promise option advisory module 62 and the decision engine 78, the user interface 80, the collection system 66, and the database 68 using, for example, a well-defined application program interface (API). Other configurations for a system architecture can be used in other embodiments.

As shown in FIGS. 10 and 17, a user in operation 1701 through a user interface 80 requests promise options from the promise option advisory module 62. Next, in operation 1703, the promise option advisory module 62 accesses case data which can be stored in the database 68 included in a database server or in collection system 66. The database 68 is populated with the case data downloaded from the collection system 66 to the database 68. The case data are the account data (discussed above) for the customer. The database 68 can be part of an additional computer system.

The case data, which are retrieved by the collection system 66, are returned to the promise option advisory module 62, as shown in operation 1705. In operation 1707, the promise option advisory module requests the decision engine 78 to calculate promise options and/or action now amounts, if needed. The action now amounts and promise options are preferably calculated on the fly from the case data, which optionally can be cached, or can be re-calculated when case data for the customer is updated, modified, deleted, or added. If the promise option advisory module 62 requests that the decision engine 78 calculate the promise options and action now amounts in operation 1707, the decision engine 78 returns the calculated promise options and action now amounts to the promise option advisory module 62, in operation 1709. If the promise option advisory module 62 does not request that the decision engine 78 calculate the promise options and action now amounts, then control proceeds directly to operation 1711. In operation 1711, the calculated promise options and action now amounts are returned to the user for presentment and selection. The user then can select an action now amount (action now operation sequence 1713, 1715) or can optionally input a customer offer amount alternative to the action now amount (customer offer operation sequence 1717, 1719, and 1729).

In the action now operation sequence, the user selects an action now amount in operation 1713, and the selected action now amount or promise option agreed to by the user is transmitted to the promise option advisory module 62. The promise option advisory module then determines a partitioned amount of the action now amount, and disperses the partitioned amount of the action now amount to levels hierarchically below the level of the selected action now amount in operation 1715. 101971 In the customer offer operation sequence, in operation 1717, the promise option advisory module determines if there is a customer offer to the action now amount. If there is a customer offer, then at operation 1719 the promise option advisory modules requests calculated amounts from the decision engine, where the amounts are based on the customer offer amount for a promise. Then, in operation 1729, the promise option advisory module determines an apportioned amount of the customer offer amount, and distributes the apportioned amount of the customer offer amount to levels hierarchically below the level of the action now amount for which the customer offers a customer offer.

Then the promise option/data and/or action now amounts from the action now operation sequence 1713, 1715 or the apportioned amount of the customer offer amount from the customer offer sequence 1717, 1719, 1729 are passed to the decision engine 78 for acceptability and tolerance checking, in operation 1721. In operation 1723, the validation results are returned to the promise option advisory module 62. If the validation results contain errors, the errors are returned to the user in operation 1727.

If the validation results do not contain errors then, in operation 1725, an accepted message is sent to the user via the user interface 80, the customer's case is updated, preferably, in the database 68 or in the collection system 66, and the promise data (perhaps as modified by a customer offer) is recorded for strategy evaluation and tuning in database 68. The customer's case data is transmitted between the collection system 66 and the database 68, as shown in FIG. 10, to reconcile the data stored in the collection system 66 and the database 68.

Various flow charts are used herein to describe the operation. These flow charts illustrate examples, and it should be understood that these flow charts can easily be modified to illustrated changes which are encompassed by the embodiments. For example, in the flow charts, operations can be performed in a different order, and many of the operations can be eliminated or added to various embodiments. Such changes should be considered to be within the spirit and scope.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method of managing case based promises to pay, implemented in a computer that has a processor which is cooperatively operable with a display that is operable to receive screens to be displayed to a user, the method comprising:
    displaying, from a processor which is cooperatively operable with a display that is operable to receive screens to be displayed to a user, a customer hierarchy, wherein the customer hierarchy displays (i) a customer level with customer level information and (ii) plural account levels with account level information for respective multiple accounts of a customer needing collection;
    displaying, from the processor which is cooperatively operable with the display, action now amounts for the customer on the customer level and on the account levels of the customer hierarchy;
    wherein the account level information is rolled up into the customer level information; and
    interacting with a user, from the processor which is cooperatively operable with the display, to select the action now amount for an upper level in the customer hierarchy, and dispersing a partitioned amount of the action now amount to levels which the customer can promise to pay, for levels which are hierarchically below the level of the selected action now amount in the customer hierarchy; and
    interacting with the user to input a customer offer to pay, calculating portions of the customer offer to be distributed as apportioned amounts among at least one level which is hierarchically below the level in the customer hierarchy, and distributing the customer offer among the at least one level which is hierarchically below the level in the customer hierarchy.

2. The method of claim 1, wherein the customer hierarchy further includes intervening group levels, with the account level information being rolled up into intervening group level information, and the intervening group level information being rolled up into the customer level information.

3. The method of claim 1, wherein the account level information and customer level information include respective promise due dates, further comprising:
    copying a selected promise due date to all levels which are hierarchically below the level in the customer hierarchy of the selected promise due date.

4. The method of claim 3, wherein there are plural possible promise due dates for each of the account levels and the customer level, further comprising using one of the plural possible promise due dates for the selected level which is closest in time to the current date as the promise due date which is copied.

5. The method of claim 1, wherein the user is a collector whose job is to collect payments or debts, wherein the interacting with the user occurs after the collector interacts with the customer to obtain agreement to pay the action now amount, and the collector thereafter selects the displayed action now amount which was agreed to with the customer.

6. The method of claim 1, the portions of the customer offer to be distributed as the apportioned amounts among the at least one level are based on the customer hierarchy, plural rules for calculating the apportioned amounts to obtain an optimal application of the customer offer, and plural parameters defining general information to be applied for the customer.

7. The method of claim 1, wherein the action now amounts are optimal and minimal promise to pay options for each account of the account levels, wherein the accounts need collection, wherein the promise-to-pay options are a single promise, a long-term promise, and a deferred payment arrangement.

8. The method of claim 7, wherein the optimal and minimal promise to pay options for each of the accounts are calculated based on plural accounts of the customer.

9. A computer-implemented system for managing case based promises to pay, comprising:
    a display operable to receive screens to be displayed to a user; and
    a processor cooperatively operable with the display and configured to facilitate:
    displaying a customer hierarchy, wherein the customer hierarchy displays (i) a customer level with customer level information and (ii) plural account levels with account level information for respective multiple accounts of a customer needing collection;
    displaying action now amounts for the customer on the customer level and on the account levels of the customer hierarchy;
    wherein the account level information is rolled up into the customer level information;
    interacting with a user to select the action now amount for an upper level in the customer hierarchy, and dispersing a partitioned amount of the action now amount to levels which the customer can promise to pay, for levels which are hierarchically below the level of the selected action now amount in the customer hierarchy;
    interacting with the user to input a customer offer to pay, calculating portions of the customer offer to be distributed as apportioned amounts among at least one level which is hierarchically below the level in the customer hierarchy, and distributing the customer offer among the at least one level which is hierarchically below the level in the customer hierarchy.

10. The system of claim 9, wherein the customer hierarchy further includes intervening group levels, with the account level information being rolled up into intervening group level information, and the intervening group level information being rolled up into the customer level information.

11. The system of claim 9, wherein the account level information and customer level information include respective promise due dates, further comprising:

copying a selected promise due date to all levels which are hierarchically below the level in the customer hierarchy of the selected promise due date.

12. The system of claim 11, wherein there are plural possible promise due dates for each of the account levels and the customer level, further comprising using one of the plural possible promise due dates for the selected level which is closest in time to the current date as the promise due date which is copied.

13. The system of claim 9, wherein the action now amounts are optimal and minimal promise to pay options for each account of the account levels, wherein the accounts need collection, wherein the promise-to-pay options are a single promise, a long-term promise, and a deferred payment arrangement.

14. The system of claim 13, wherein the optimal and minimal promise to pay options for each of the accounts are calculated based on plural accounts of the customer.

15. The system of claim 9, the portions of the customer offer are distributed as the apportioned amounts among the at least one level based on the customer hierarchy, plural rules for calculating the apportioned amounts to obtain an optimal application of the customer offer, and plural parameters defining general information to be applied for the customer.

16. The system of claim 9, wherein the user is a collector whose job is to collect payments or debts, wherein the interacting with the user occurs after the collector interacts with the customer to obtain agreement to pay the action now amount, and the collector thereafter selects the displayed action now amount which was agreed to with the customer.

17. A computer-readable medium comprising instructions being executed by a computer, the instructions including a computer-implemented method of managing case based promises to pay, the instructions for implementing the steps of:

displaying a customer hierarchy, wherein the customer hierarchy displays (i) a customer level with customer level information and (ii) plural account levels with account level information for respective multiple accounts of a customer needing collection;

displaying action now amounts for the customer on the customer level and on the account levels of the customer hierarchy;

wherein the account level information is rolled up into the customer level information;

interacting with a user to select the action now amount for an upper level in the customer hierarchy, and dispersing a partitioned amount of the action now amount to levels which the customer can promise to pay, for levels which are hierarchically below the level of the selected action now amount in the customer hierarchy; and interacting with the user to input a customer offer to pay, calculating portions of the customer offer to be distributed as apportioned amounts among at least one level which is hierarchically below the level in the customer hierarchy, and distributing the customer offer among the at least one level which is hierarchically below the level in the customer hierarchy.

18. The computer-readable medium of claim 17, wherein the user is a collector whose job is to collect payments or debts, wherein the interacting with the user occurs after the collector interacts with the customer to obtain agreement to pay the action now amount, and the collector thereafter selects the displayed action now amount which was agreed to with the customer.

19. The computer-readable medium of claim 17, wherein the action now amounts are optimal and minimal promise to pay options for each account of the account levels, wherein the accounts need collection, wherein the promise-to-pay options are a single promise, a long-term promise, and a deferred payment arrangement.

20. The computer-readable medium of claim 17, wherein the customer hierarchy further includes intervening group levels, with the account level information being rolled up into intervening group level information, and the intervening group level information being rolled up into the customer level information.

21. The computer-readable medium of claim 17, wherein the account level information and customer level information include respective promise due dates, further comprising:

copying a selected promise due date to all levels which are hierarchically below the level in the customer hierarchy of the selected promise due date.

22. The computer-readable medium of claim 21, wherein there are plural possible promise due dates for each of the account levels and the customer level, further comprising using one of the plural possible promise due dates for the selected level which is closest in time to the current date as the promise due date which is copied.

23. The computer-readable medium of claim 17, the portions of the customer offer are distributed as the apportioned amounts among the at least one level based on the customer hierarchy, plural rules for calculating the apportioned amounts to obtain an optimal application of the customer offer, and plural parameters defining general information to be applied for the customer.

24. The computer-readable medium of claim 17, wherein the optimal and minimal promise to pay options for each of the accounts are calculated based on plural accounts of the customer.

25. A computer-implemented system for managing case based promises to pay, comprising:

a display operable to receive screens to be displayed to a user; and a processor cooperatively operable with the display and configured to facilitate:

displaying, from the processor which is cooperatively operable with the display that is operable to receive screens to be displayed to the user, a customer hierarchy, wherein the customer hierarchy displays (i) a customer level with customer level information and (ii) plural account levels with account level information for respective multiple accounts of a customer needing collection;

displaying, from the processor which is cooperatively operable with the display, action now amounts for the customer on the customer level and on the account levels of the customer hierarchy;

wherein the account level information is rolled up into the customer level information; and interacting with a user, from the processor which is cooperatively operable with the display, to select the action now amount for an upper level in the customer hierarchy, and dispersing a partitioned amount of the action now amount to levels which the customer can promise to pay, for levels which are hierarchically below the level of the selected action now amount in the customer hierarchy; and interacting with the user to input a customer offer to pay, calculating portions of the customer offer to be distributed as apportioned amounts among at least one level which is hierarchically below the level in the customer hierarchy, and distributing the customer offer among the at least one level which is hierarchically below the level in the customer hierarchy.

* * * * *